(12) United States Patent
Kagata

(10) Patent No.: US 8,801,133 B2
(45) Date of Patent: Aug. 12, 2014

(54) IMAGE FORMING APPARATUS AND IMAGE FORMING METHOD

(75) Inventor: Takayoshi Kagata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 13/410,538

(22) Filed: Mar. 2, 2012

(65) Prior Publication Data

US 2012/0223993 A1     Sep. 6, 2012

(30) Foreign Application Priority Data

Mar. 3, 2011  (JP) ................. 2011-046641

(51) Int. Cl.
*B41J 29/38* (2006.01)
*G06K 15/02* (2006.01)

(52) U.S. Cl.
CPC ........ *G06K 15/1871* (2013.01); *G06K 15/1877* (2013.01)
USPC .......................................................... 347/14

(58) Field of Classification Search
CPC ................... G06K 15/1871; G06K 15/1877
USPC .......................................................... 347/14
See application file for complete search history.

(56) References Cited

U.S. PATENT DOCUMENTS 5,742,300 A * 4/1998 Klassen ............................. 347/9
2009/0075036 A1 * 3/2009 Itano et al. ................. 428/195.1

FOREIGN PATENT DOCUMENTS

JP       11-078204 A    3/1999

* cited by examiner

*Primary Examiner* — Manish S Shah
*Assistant Examiner* — Jeffrey C. Morgan
(74) *Attorney, Agent, or Firm* — Nutter McClennen & Fish LLP; John J. Penny, Jr.; Michael P. Visconti, III

(57) ABSTRACT

An image forming apparatus includes: a head unit that ejects ink; and a control unit that creates pixel data showing the amount of the ink ejected on predetermined pixels, and ejects metallic ink containing metallic particles from the head units such that the amount of the metallic ink is smaller than the amount of the metallic ink shown by the pixel data in a portion of the pixel inside the pixels on the outline of a metallic image formed by the ejected metallic ink and such that the amount of the eject ink per area is larger than the amount of the metallic ink at the inside pixels in the pixels on the outline, on the basis of the pixel data.

6 Claims, 18 Drawing Sheets

NARROW THINNED GAP

SMALL OUTLINE WIDTH

WIDE THINNED GAP

LARGE OUTLINE WIDTH

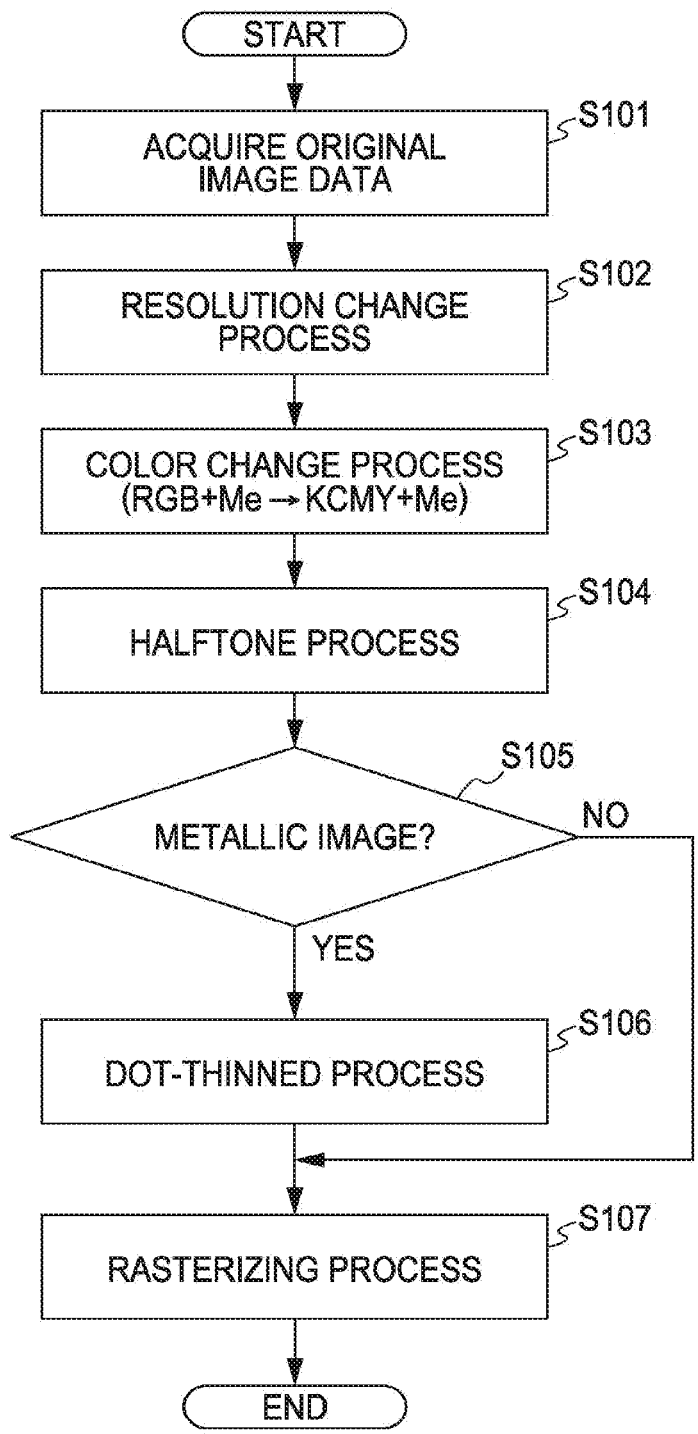

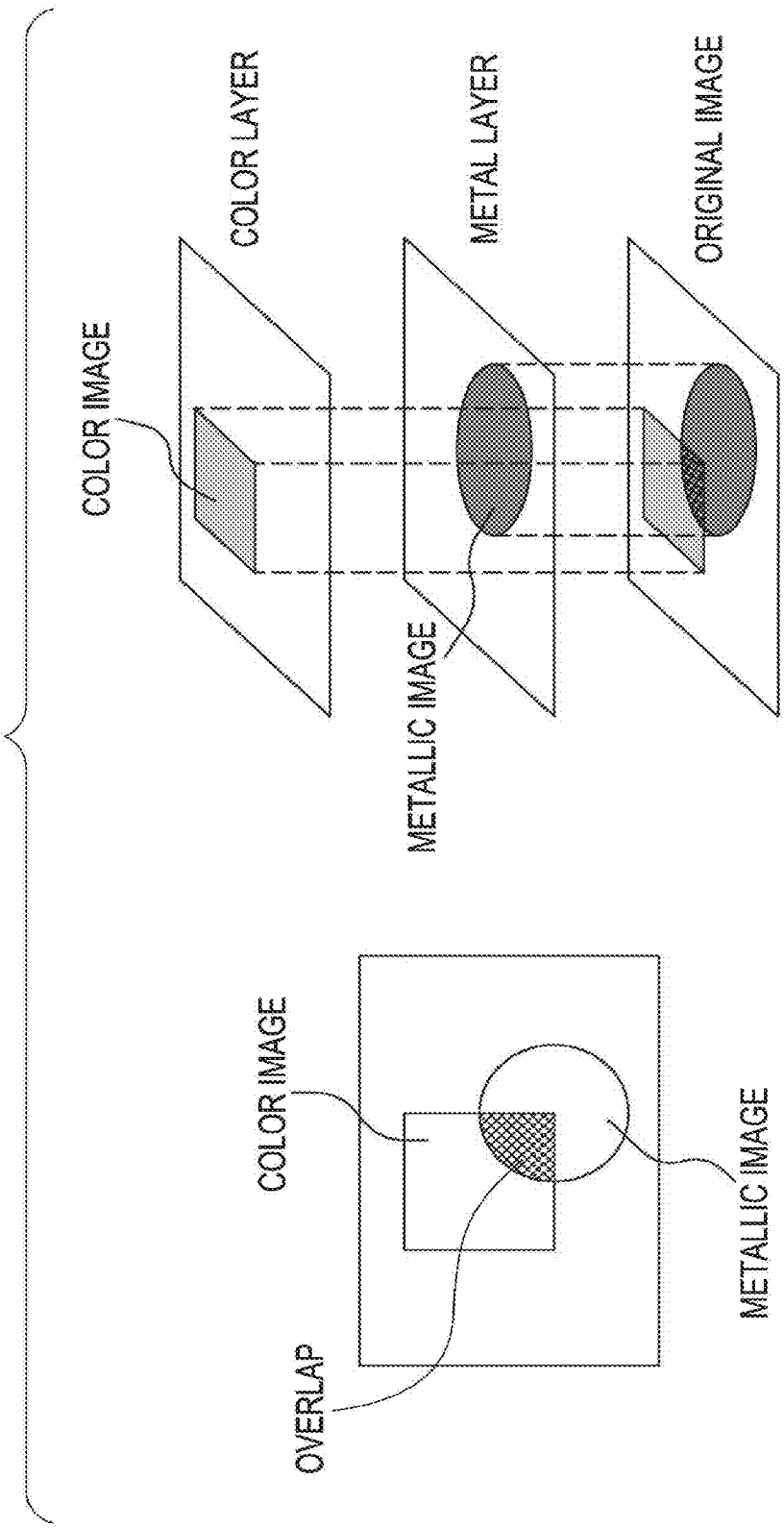

IMAGE FORMING APPARATUS AND IMAGE FORMING METHOD

BACKGROUND

1. Technical Field

The present invention relates to an image forming apparatus and an image forming method.

2. Related Art

There has been known an image forming apparatus that performs recording by discharging liquid from a nozzle such that ink droplets (dots) are landed on a medium. In the image forming apparatus, printing is performed by using metallic ink containing metal particles, such as aluminum particles, as a pigment, other than common color ink (for example, color ink of KCMY).

In metallic printing using metallic ink, since the metallic luster and color tone of a printed matter are changed by the amount of the metal particles contained in the ink, it was difficult to implement metallic printing with a desired color tone and metallic luster. Accordingly, a printing method has been proposed, which adjusts the amount of aluminum powder contained in a print and metallic luster by making the printed shape of the ink in a net shape and changing the size of the net, when performing printing by using the ink containing the aluminum powder as metal particles (for example, JP-A-11-78204).

According to the printing method of JP-A-11-78204, it is possible to print an image with a high quality image and favorable metallic luster. When an image is formed such that the portion printed with metallic ink becomes a net shape, metallic ink dots are partially thinned in the pixels of the image and printing is performed. However, as the metallic ink dots are thinned from the pixels at the outline of the image, the entire image may be seen dimly, which deteriorates the image quality. That is, it may be difficult to print a clear metallic image in the method described in JP-A-11-78204.

SUMMARY

An advantage of some aspects of the invention is to form a clear metallic image with favorable metallic luster and color tone without dimming the outline when performing printing by using metallic ink.

According to an aspect of the invention, there is provided an image forming apparatus including (A) a head unit that ejects ink and (B) a control unit that creates pixel data showing the amount of the ink ejected on predetermined pixels, and ejects metallic ink containing metallic particles from the head units such that the amount of the metallic ink is smaller than the amount of the metallic ink shown by the pixel data in a portion of the pixel inside the pixels on the outline of a metallic image formed by the ejected metallic ink and such that the amount of the eject ink per area is larger than the amount of the metallic ink at the inside pixels in the pixels on the outline, on the basis of the pixel data.

Other features of the invention will be made clear from the specification and the description of the accompanying drawings.

BRIEF DESCRIPTION OF THE DRAWINGS

The invention will be described with reference to the accompanying drawings, wherein like numbers reference like elements.

FIG. 8 is a view showing the flow of a printing process in a first embodiment of the invention.

FIG. 12 is a conceptual view of an image printed in a second embodiment.

DESCRIPTION OF EXEMPLARY EMBODIMENTS

Figure 1:
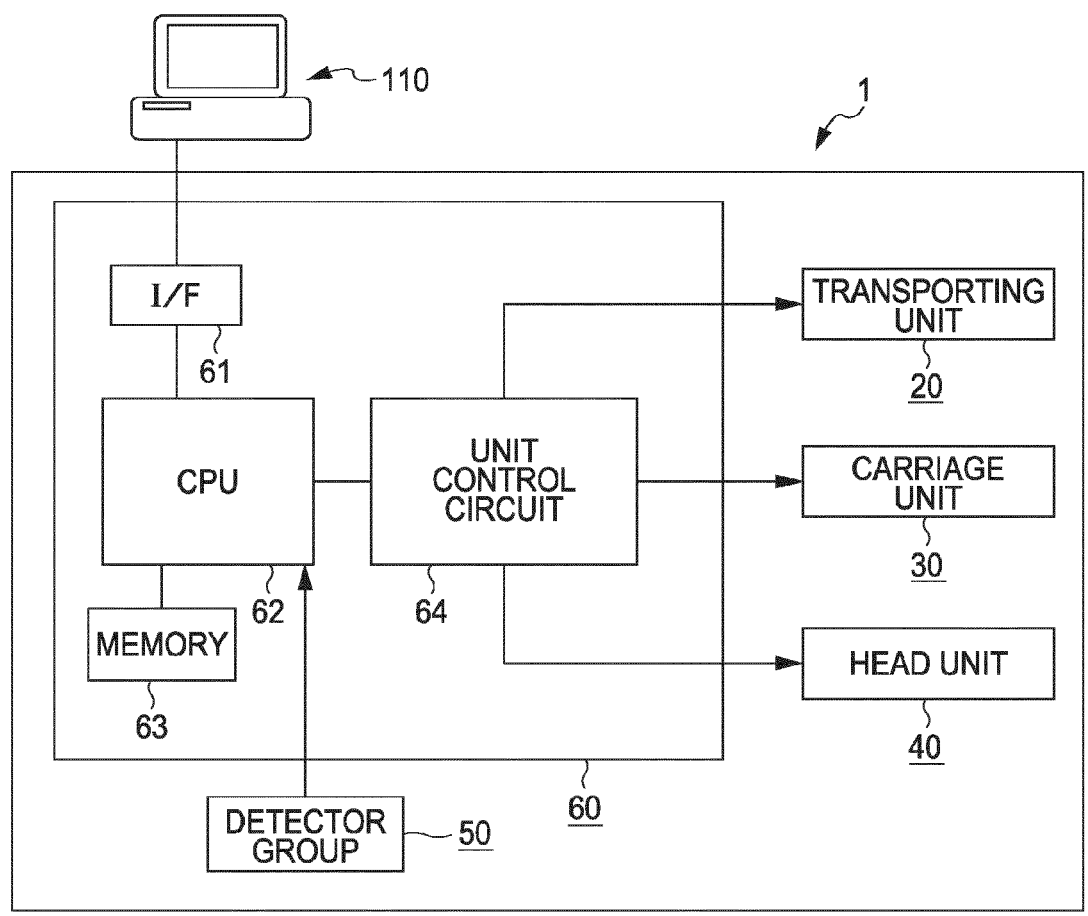
FIG. 1 is a block diagram showing the entire configuration of a printer.

At least the followings are made clear by the description of the specification and the accompanying drawings.

An image forming apparatus includes (A) a head unit that ejects ink and (B) a control unit that creates pixel data showing the amount of the ink ejected on predetermined pixels, and ejects metallic ink containing metal particles from the head units such that the amount of the metallic ink is smaller in a portion of the pixel inside the pixels on the outline of a metallic image formed by the ejected metallic ink than the amount of the metallic ink shown by the pixel data and such that the amount of the eject ink per area is larger in the pixels on the outline than the amount of the metallic ink at the inside pixels, on the basis of the pixel data.

According to the image forming apparatus, it is possible to form a clear metallic image with favorable metallic luster and color tone without dimming the outline when performing printing by using metallic ink.

In the image forming apparatus, it is preferable for the control unit to create metallic print data showing pixels with ejected metallic ink and pixels without ejected metallic ink by thinning the data of predetermined pixels in the pixels shown by pixel data in a region inside the pixels on the outline of the metallic image.

According to the image forming apparatus, the amount of the ejected ink is determined by a thinning pattern of dots, such that it is possible to freely adjust the amount of ejected metallic ink by changing the data of the thinning pattern.

In the image forming apparatus, the control unit preferably increases the pixels on the outline of the metallic image when the amount of data thinned from the pixel data, and decreases the pixels on the outline of the metallic image when the amount of data thinned from the pixel data is small.

According to the image forming apparatus, it is possible to always clearly print a metallic image by forming a metallic image having an outline with an optimal width, in accordance with the amount of dot thinning.

In the image forming apparatus, the control unit preferably ejects the metallic ink of the amount shown by the pixel data to the pixels on the outline of the metallic image.

According to the image forming apparatus, it is possible to perform printing with a high image quality clearer than the outline of a metallic image by ejecting a sufficient amount of metallic ink, without thinning the outline pixels.

In the image forming apparatus, the control unit preferably thins the data of predetermined pixels in the pixels shown by the pixel data and ejects the metallic ink onto the pixels outside the outline of the metallic image.

According to the image forming apparatus, a new outline is formed by the metallic ink ejected on the pixels outside the outline of the metallic image, such that it is easy to print a clear image with a high image quality, with the outline of the metallic image emphasized.

In the image forming apparatus, the control unit preferably thins the data of predetermined pixels in the pixels shown by the pixel data and moves some of the data of the pixels not to be thinned to the pixels to be thinned, in the pixels on the outline of the metallic.

According to the image forming apparatus, as a new outline is formed by the moved metallic ink dots, the outline of the metallic image becomes emphasized and it is easy to print a clear image with a high image quality.

An image forming method includes (A) ejecting ink from a head unit and (B) creating pixel data showing the amount of the ink ejected on predetermined pixels, and ejecting metallic ink containing metal particles from the head units such that the amount of the metallic ink is smaller in a portion of the pixel inside the pixels on the outline of a metallic image formed by the discharged metallic ink than the amount of the metallic ink shown by the pixel data and such that the amount of the discharge ink per area is larger in the pixels on the outline than the amount of the metallic ink at the inside pixels, on the basis of the pixel data.

Basic Configuration of Image Forming Apparatus

An ink jet printer (printer 1) is exemplified as an embodiment of an image forming apparatus for implementing the invention.

Configuration of Printer 1

FIG. 1 is a block diagram showing the entire configuration of a printer 1.

The printer 1 is an image forming apparatus that forms (prints) characters or images on a medium, such as paper, cloth, or film and is connected with a computer 110 that is an external device to be able to communicate.

A printer driver is installed in the computer 110. The printer driver is a program for displaying a user interface and converting image data output from an application program into record data. The printer driver is recorded on a recording medium (a computer-readable recording medium), such as a flexible disk FD or a CD-ROM. Further, the printer driver can also be downloaded to the computer 110 through the internet. Further, the program is composed of codes for implementing various functions.

The computer 110 is an image forming apparatus control unit that outputs print data to the printer 1 in accordance with an image to print, in order to print the image in the printer 1.

The printer 1 includes a transporting unit 20, a carriage unit 30, a head unit 40, a detector group 50, and a controller 60. The controller 60 controls the units on the basis of print data received from the computer 110, which is an image forming apparatus control unit, to form an image on a medium. The situation in the printer 1 is monitored by the detector group 50 and the detector group 50 outputs the detection result to the controller 60. The controller 60 controls the units on the basis of the detection result output from the detector group 50.

Transporting Unit 20

Figure 2A:
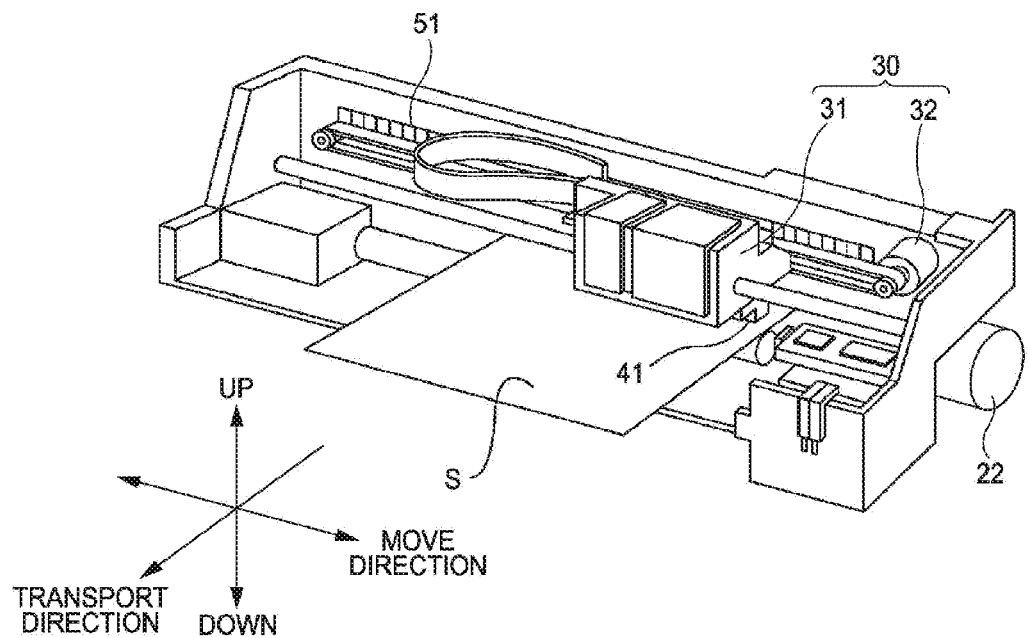
FIG. 2A is a view illustrating the configuration of the printer of the embodiment of the invention.
Figure 2B:
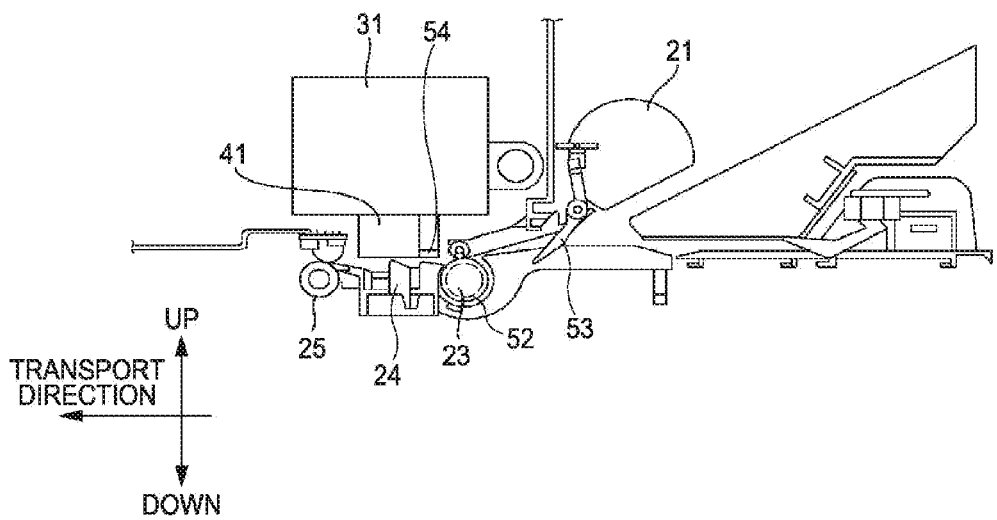
FIG. 2B is a side view illustrating the configuration of the printer of the embodiment of the invention.

FIG. 2A is a view illustrating the configuration of the printer 1 of the embodiment. FIG. 2B is a side view illustrating the configuration of the printer 1 of the embodiment.

The transporting unit 20 is provided to convey a medium (for example, paper S or the like) in a predetermined direction (hereafter, a transport direction). The transport direction is a direction intersects the movement direction of the carriage. The transporting unit 20 includes a feeding roller 21, a transporting motor 22, a transporting roller 23, a platen 24, and a discharge roller 25 (FIGS. 2A and 2B).

The feeding roller 21 is a roller for feeding paper S inserted into a paper insertion slot to the printer. The transporting roller 23 is a roller that transports the paper S fed by the feeding roller 21 to a recordable region and is driven by the transporting motor 22. The operation of the transporting motor 22 is controlled by the controller 60 at a side in the printer. The platen 24 is a member supporting the paper S that is being recorded, from the back of the paper S. The discharge roller is a roller 25 is roller that discharges the paper to the outside of the printer and is disposed downstream further than the recordable region in the transport direction.

Carriage Unit 30

The carriage unit 30 is provided to move (also called scan) the carriage 31 equipped with the head unit 40 in a predetermined direction (hereafter, movement direction). The carriage unit 30 includes the carriage 31 and a carriage motor 32 (also referred to as a CR motor) (FIGS. 2A and 2B).

The carriage 31 can reciprocate in the movement direction and is driven by the carriage motor 32. The operation of the carriage motor 32 is controlled by the controller 60 at a side in the printer. Further, the carriage 31 detachably holds a cartridge receiving liquid (hereafter, referred to as ink) for recording an image.

Head Unit 40

The head unit 40 is provided to eject ink onto the paper S. The head unit 40 includes a head 41 equipped with a plurality of nozzles. The head 41 is disposed on the carriage 31 and when the carriage 31 moves in the movement direction, the head 41 correspondingly moves in the movement direction. Further, as the head 41 continually ejects ink while moving in the movement direction, a dot line (raster line) is formed on the paper in the movement direction.

Figure 3:
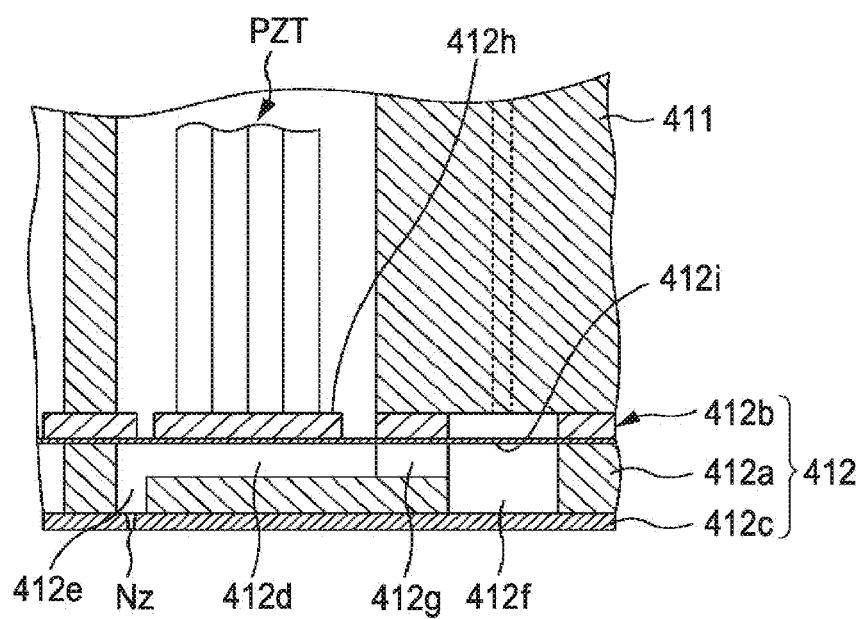
FIG. 3 is a cross-sectional view illustrating the structure of a head.

FIG. 3 is a cross-sectional view showing the configuration of the head 41. The head 41 includes a case 411, a flow channel unit 412, and a piezo element group PZT. The case 411 accommodates the piezo element group PZT and the channel unit 412 is connected to the bottom of the case 411. The flow channel unit 412 includes a channel forming plate 412a, an elastic plate 412b, and a nozzle plate 412c. A groove that is a pressure chamber 412d, a through-hole that is a nozzle connection hole 412e, a through-hole that is a common ink chamber 412f, and a groove that is an ink supply channel 412g are formed on the channel forming plate 412a. The elastic plate 412b has an island 412h where the front end of the piezo element PZT is connected. An elastic region is formed by an elastic layer 412i around the island 412h. The ink stored in the ink cartridge is supplied to the pressure chamber 412d corresponding to the nozzles Nz through the common ink chamber 412f. The nozzle plate 412c is a plate where the nozzles Nz are formed.

The piezo element group PZT includes a plurality of pectinate piezo elements (driving elements) and the number of piezo element groups corresponding to the number of the nozzles Nz are provided. The piezo elements are extended/contracted up/down in accordance with the potential of a driving signal COM by a circuit board (not shown) equipped with a head control unit HC, when the driving signal COM is applied to the piezo elements. As the piezo elements PZT extends/contracts, the island 412h is pushed to the pressure chamber 412d or pulled in the opposite direction. In this operation, the elastic layer 412i around the island 412h deforms and the internal pressure of the pressure chamber 412d increases/decreases, such that ink droplets are ejected from the nozzles.

Figure 4:
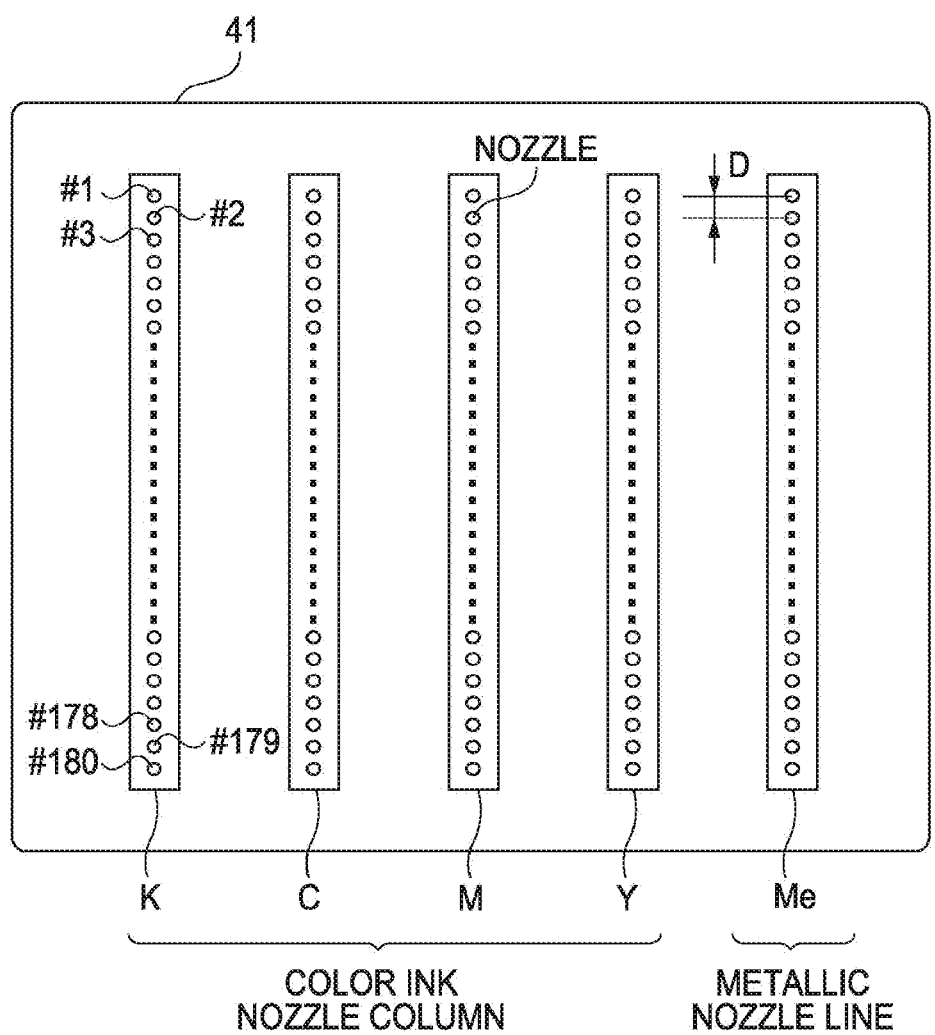
FIG. 4 is an illustrative view of nozzles disposed on the heads.

FIG. 4 is an illustrative view of nozzles $N_z$ disposed on the bottom of the head 41. Color ink nozzle lines, including an yellow nozzle line Y ejecting yellow ink, a magenta nozzle line M ejecting magenta ink, a cyan nozzle line C ejecting cyan ink, and a black nozzle line K ejecting black ink, and a metallic nozzle line Me ejecting metallic ink are disposed on the nozzle surface. As shown in FIG. 4, the nozzles Nz that are ejecting holes for ejecting various colors of ink are aligned with predetermined intervals D in the transport direction. The nozzle lines each include 180 nozzles Nz of #1 to #180. The actual number of nozzles in each other nozzle lines is 180, but for example, the number of nozzles may be 90 or 360. Further, in FIG. 4, the nozzle lines are aligned in the movement direction, but the nozzle lines may be aligned in column in the transport direction. Further, it may be possible to provide not one nozzle line for each of the colors KCMY to Me, but a plurality of nozzle lines for each of the colors.

Detector Group 50

The detector group 50 is provided to monitor the situation of the printer 1. The detector group 50 includes a linear type encoder 51, a rotary type encoder 52, a paper sensor 53, and an optical sensor 54 (FIGS. 2A and 2B).

The linear type encoder 51 detects the position of the carriage 31 in the movement direction. The rotary type encoder 52 detects the rotation amount of the transporting roller 23. The paper sensor 53 detects the position of the front end of the paper S that is being fed. The optical sensor 54 detects whether there is paper S at the opposite position by using a light emitting portion and a light receiving portion, which are mounted on the carriage 31, and for example, it can detect the position of the end of the paper and the width of the paper while moving. Further, the optical sensor 54 can also detect the front end (the downstream end in the transport direction and also called an upper end) and the rear end (the upstream end in the transport direction and also called a lower end) of the paper S, if necessary.

Controller 60

The controller 60 is a control unit (control unit) for controlling the printer. The controller 60 includes an interface unit 61, a CPU 62, a memory 63, and a unit control circuit 64 (FIG. 1).

The interface unit 61 communicates data between the computer 110 that is an external device and the printer 1. The CPU 62 is a calculation process unit for controlling the entire printer 1. The memory 63 is provided to ensure an area where programs of the CPU 62 is received or an operation area and implemented by a storage device, such as RAM and an EEPROM. Further, the CPU 62 controls the units, including the transporting unit 20, through the unit control circuit 64, in accordance with the programs stored in the memory 63.

Printing of Printer

Printing of the printer 1 is briefly described. The controller 60 performs paper feeding process, a dot forming process, and a transporting process by receiving a printing instruction from the computer 110 through the interface 61 and controlling the units.

The paper feeding process is a process of supplying paper to print into the printer and positioning the paper at a print start position (referred to as a head poke position). The controller 60 sends the paper to print to the transporting roller 23 by rotating the feeding roller 21. Next, the controller 60 positions the paper sent from the feeding roller 21 to the print start position by rotating the transporting roller 23.

The dot forming process is a process of forming dots on paper by continually ejecting ink from the head moving in the movement direction (scanning direction). The controller 60 allows ink to be ejected from the head 41 on the basis of print data while the carriage 31 moves, by moving the carriage 31 in the movement direction. When the ejected ink drops are landed on the paper, dots are formed on the paper and a dot line of a plurality of dots is formed in the movement direction on the paper.

The transporting process is a process of moving the paper in the transport direction relatively to the head. The controller 60 transports the paper in the transport direction by rotating the transporting roller 23. By the transporting process, the head 41 can form dots at positions different from the positions of the dots formed by the forming of dots.

The controller 60 gradually prints an image composed of dot lines on paper by repeating of the dot forming process and the transporting process until the data to be printed is finished. Further, when there is no data to be printed, the controller rotates the discharge roller 25 to discharge the paper. Further, it is preferable to determine whether to discharge the paper on the basis of a discharge command included in the print data.

The same processes are repeated to perform printing on the next paper, or the printing is finished when printing is not performed on the next paper.

There are "unidirectional printing" that ejects ink droplets from the nozzle in forward movement in which the head 41 moves from the right (home position) to the left in the movement direction (scanning direction) and does not eject ink droplets from the nozzles in backward movement in which the head 41 moves from the left to the right in the movement direction and "bidirectional printing" that ejects ink droplets from the nozzle in the forward movement and the backward movement, in the printing of the printer 1. The printing method described in the embodiment can be applied to any one of the "unidirectional printing" and the "bidirectional printing".

Metallic Ink Used in Printing

Metallic ink contains silver particles or aluminum particles as metal particles. It is possible to bright metallic luster on the printed surface from the metallic ink containing aluminum particles. However, the aluminum particles are easily oxidized and the printed surface may be whitened as the time passes. On the other hand, in the metallic ink containing silver particles, the color of the metallic luster is easily darkened and the cost is high in comparison to the ink containing aluminum particles, but it is not easily oxidized and has high stability. The metallic ink used in printing can be selected in accordance with the use of printing, but printing using metallic ink containing silver particles is described in the embodiment of the specification. Further, according to the printing method according to the embodiments described hereafter it is possible to solve the problems of the cost and darkening when silver particles are used, which is described above.

Pure water, such as ion-exchange water, ultrafiltration water, reverse osmosis water, and distilled water, ultrapure water is used for a metallic solvent. Ions may exist in the water unless they interfere with dispersion of the metal particles. Further, if necessary, a surface acting agent, multiple alcohol, a pH adjuster, resin, and a color material may be contained.

The silver particles contained in the ink composition of the embodiment are particles mainly containing silver. The silver particles may contain, for example, other metal, oxygen, and carbon, as sub-components. The purity of silver of the silver particles may be 80% or more, for example. The silver particles may be alloys of silver and other metal. Further, the silver particles in the ink composition may exist in a colloid state (particle colloid). When the silver particles are dispersed in a colloid state, dispersibility is improved, and for example, it is possible to contribute to improving preservation stability of the ink composition.

The particle diameter d90 of the silver particles in a grain size accumulation curve is 50 nm to 1 μm. The grain size accumulation curve is a kind of curve from which it is possible to statistically acquire the result of measuring that can acquire the diameter and the number of silver particles dispersed in liquid, such as the ink composition. In the grain size accumulation curve described herein, the horizontal axis is the diameter of particles and the vertical axis is the value accumulating (integrating) the mass of the particles (the volume, density, and accumulation of the number of the particles, assuming that the particles are spheres) from the particle with a smaller diameter to a particle with a larger diameter. Further, the particle diameter d90 is the value on the horizontal axis, that is, the diameter of the particle when the value on the vertical axis is 90% (0.90), when the vertical axis is normalized (when the total measure mass of the particles is 1), in the grain size accumulation curve. Further, the diameter of the silver particles in this case may be the diameter of the silver particles themselves, or may be the diameter of the particle colloid when the silver particles are dispersed in a colloid shape.

The grain size accumulation curve of the silver particles may be acquired, for example, by using a particle size dispersion measuring device based on dynamic light scattering. The dynamic light scattering is to radiate laser light to dispersed silver particles and observe the scattered light with a photon detector. In general, the dispersed silver particles keep making Brownian motion. The motion velocity of the silver particles increases with the increase in diameter of the particles, and decreases with the decrease in diameter of the particles. When laser light is radiated to the silver particles making Brownian motion, vibration corresponding to Brownian motion of the silver particles is observed from the scattered light. An auto-correlation function is acquired by a photon correlation method by measuring the vibration and it is possible to acquire the diameter of the silver particles of the degree of frequency (number) of the silver particles corresponding to the diameter by using cumulant approach or histogram analysis. In particular, it is possible to relatively easily acquire a grain size accumulation curve from dynamic scattering for a sample containing silver particles having a submicron size, because dynamic scattering is suitable. The particle diameter distribution measuring device based on dynamic scattering may be Nano-track UPA-EX 150 (by NIKKISO), ELSZ-2 and DLS-8000 (by Otsuka Electronics Co., Ltd.), and LB-550 (by HORIBA, Ltd.).

First Embodiment

In the first embodiment, an image composed of metallic dots is formed on a medium by performing metallic printing with metallic ink (and color ink). In the embodiment, images are formed such that a metallic image formed only with metallic ink and a color image formed only with color ink has an overlap on a medium. In this case, an image is formed at a region inside the outline of the metallic image such that metallic ink dots are thinned in a predetermined ratio. Further, in the embodiment, the color image may not be necessarily formed. Hereafter, when only a metallic image is formed is described in the first embodiment.

Dot Thinning of Metallic Image

A method of dot thinning is described by exemplifying when a metallic image having a circular shape is printed with metallic ink. In the embodiment, dots are thinned with a predetermined ratio in the region inside the outside of the metallic image. In other words, a metallic image is formed by ejecting metallic ink to be smaller than the ink amount shown by pixel data of the metallic image, in some of pixels inside the pixels on the outline of the metallic image.

Figure 5A:
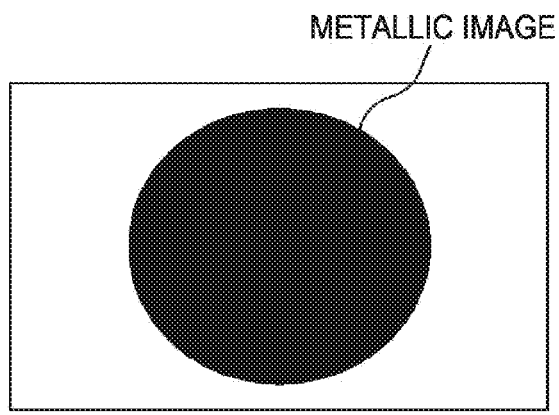
FIG. 5A is a view showing the original image of a metallic image before dot-thinning.
Figure 5B:
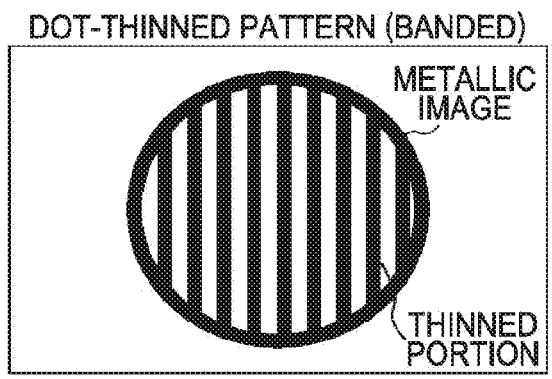
FIG. 5B is a view showing an example of an image pattern printed when the dots are thinned zig-zag shape in the metallic image.
Figure 5C:
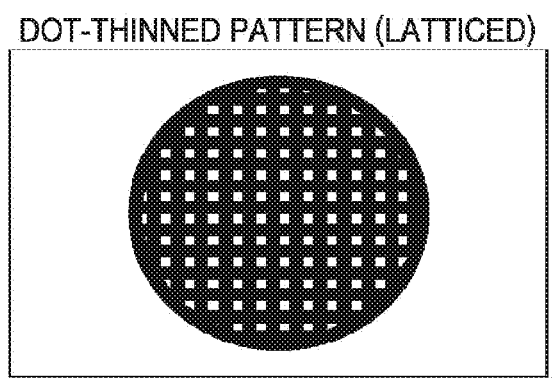
FIG. 5C is a view showing an example of an image pattern printed when the dots are thinned such that the metallic image is latticed.
Figure 5D:
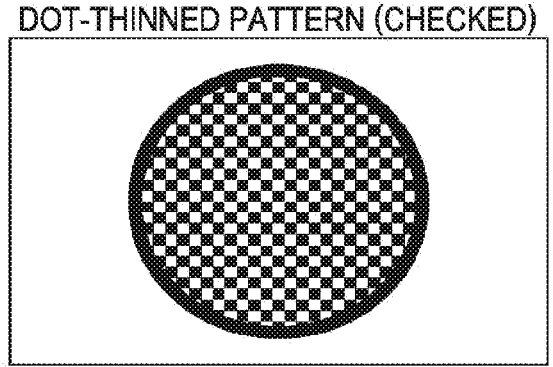
FIG. 5D is a view showing an example of an image pattern printed when the dots are thinned such that the metallic image is checked.

FIGS. 5A to 5D are views illustrating an example when dots inside the outline of a circular metallic image are thinned. FIG. 5A is a view showing the surface of the original image of a metallic image before dot-thinning. FIG. 5B shows an example of an image pattern printed when dots are thinned in a streak shape in the metallic image of FIG. 5A. FIG. 5C shows an example of an image pattern printed when dots are thinned in a lattice shape. FIG. 5D shows an example of an image pattern printed when dots are thinned in a check shape. Further, in FIGS. 5B to 5D, the width and gap of thinned dots are enlarged than the actual sizes for easy understanding of the thinning pattern and the thinning pattern of the dots are shown for easy recognition.

An instruction is give to form dots throughout the pixels in the circular region of a metallic image from pixel data of the original image at a print start point. That is, as shown in FIG. 5A, printing is started on the basis of data for forming a solid circle with metallic ink. The printer driver creates metallic print data showing pixels where metallic ink is ejected and pixels where metallic ink is not ejected, by thinning data of predetermined pixels in the pixels shown by the pixel data after receiving an instruction for starting printing, and prints a metallic image where the dots inside the outline are thinned, as shown in FIGS. 5B to 5D. Further, the thinning pattern of dots may be patterns other than those shown in FIGS. 5B to 5D. The method of creating the print data is described below.

When the metallic image is formed, as shown in FIG. 5A, when entire solid printing is performed, the amount of the metallic ink in the medium is so large that too many metal particles are contained in the ink. In this state, it is difficult to achieve an image with a favorable color tone, including that the formed metallic image is seen overall dark. On the other hand, when the amount of metallic ink is small, the metal particles are insufficient and it is difficult to achieve sufficient metallic luster.

Accordingly, as shown in FIGS. 5B to 5D, it is possible to form a metallic image with both favorable metallic luster and color tone by adjusting the amount of the metal particles, by thinning some of dots from the printed image.

Outline of Metallic Image

However, in the embodiment, dot thinning is not performed on the outline (edge) of the metallic image even if any thinning pattern is employed. The difference in texture is remarkable in comparison to the printed surface with a different color or the medium itself (color of the medium), because the printed surface of the metallic image has specific texture from the metallic luster. Therefore, when the metallic ink dots are thinned from the pixels on the outline of the metallic image (pixels at the interface between the medium and the metallic image), the outer circumference becomes clear and the entire metallic image is likely to be seen dimly. Accordingly, it is necessary to always form a sufficient amount of metallic ink dots in the pixels on the outline (edge) of the metallic image.

Figure 6A:
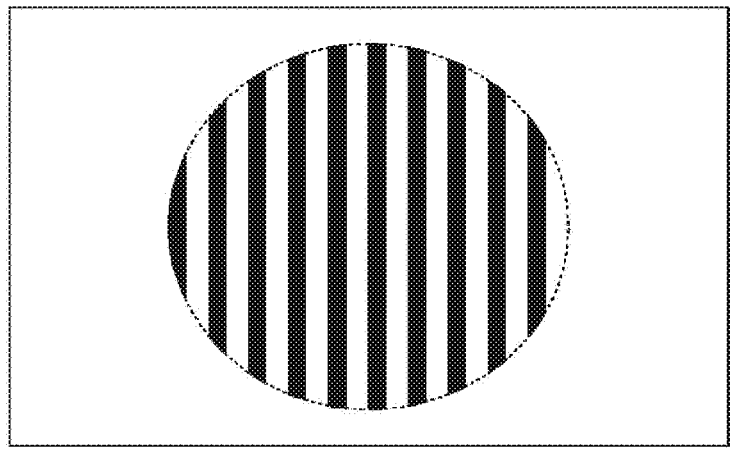
FIG. 6A is a view showing an example when the edge of a metallic image is thinned.
Figure 6B:
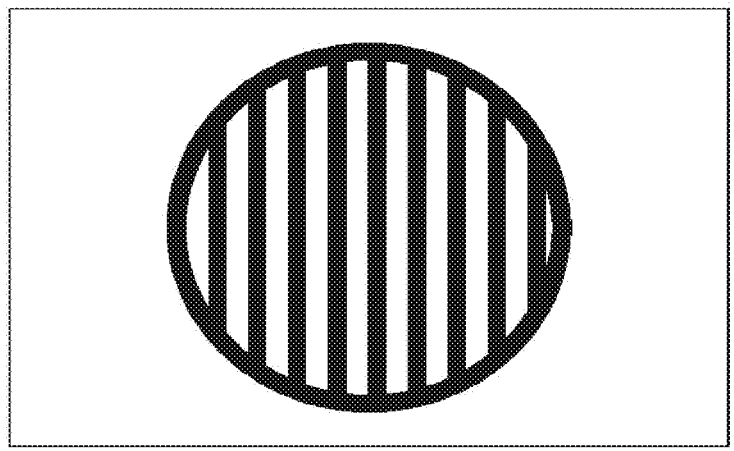
FIG. 6B is a view showing an example when the edge of a metallic image is not thinned.

FIG. 6A shows an example when dots on the outline of a metallic image are thinned. Further, FIG. 6B shows an example when dots on the outline of a metallic image are not thinned. As shown in FIG. 6A, when the outline of the metallic image is included in the thinning target, the interface of the metallic image and the background (the color of the medium) is disconnected, such that the outline of the metallic image is absorbed into the background of the metallic image and the entire metallic image is seen dimly. On the other hand, as shown in FIG. 6B, when the outline of the metallic image is included in the thinning target, the image is printed without disconnecting the interface of the metallic image and the background, such that the outline of the metallic image is clear and the entire image is seen sharp.

As described above, in the embodiment, the pixels on the outline of the metallic image are not the target of a dot thinning process, even though any thinning pattern is used (for example, any pattern in FIGS. 5B to 5D is used).

Figure 7A:
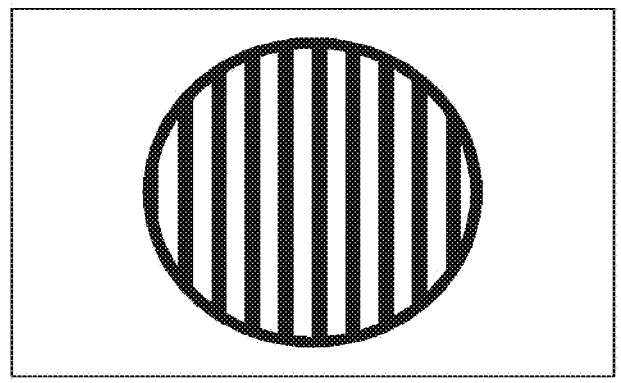
FIG. 7A is a conceptual view of a metallic image with dots thinned with a standard interval when dots are thinned in a streak shape.
Figure 7B:
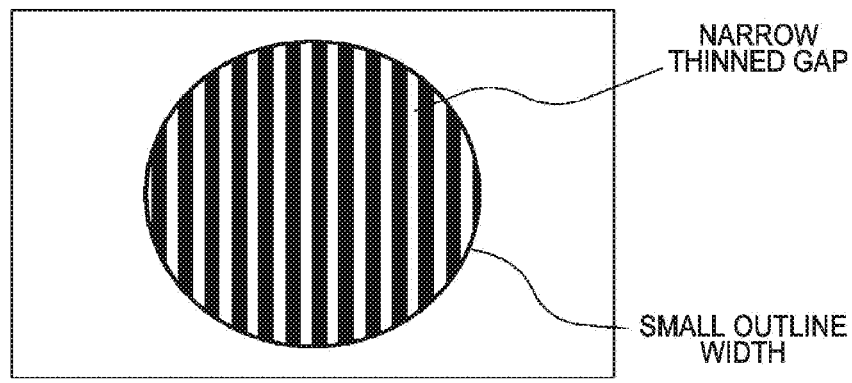
FIG. 7B is a conceptual view when thinning interval of the dots is smaller than that of FIG. 7A.
Figure 7C:
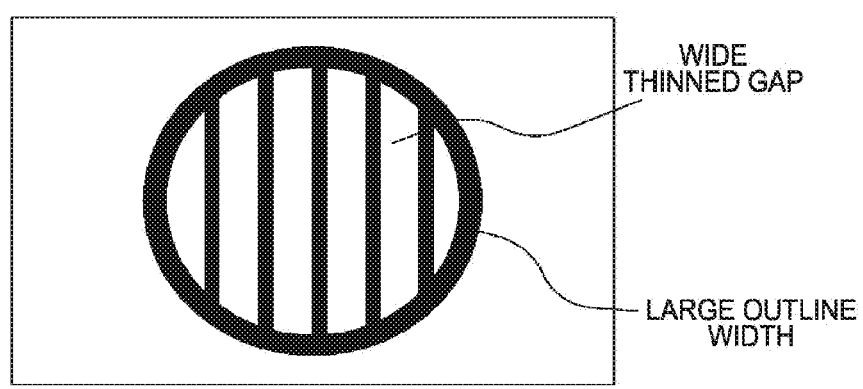
FIG. 7C is a conceptual view when thinning interval of the dots is larger than that of FIG. 7A.

Further, since the entire appearance of the metallic image is changed by the thickness of the outline (width of the outline), the width of the pixels that are not included in the thinning target on the outline may be changed in accordance with the dot thinning gap or thinning width of the metallic image. FIGS. 7A to 7C are views illustrating the width of the outline of a metallic image. FIG. 7A is a conceptual view of a metallic image when dots are thinned in a streak shape or when dots are thinned with a interval. FIG. 7B is a conceptual view when thinning interval of the dots is smaller than that of FIG. 7A. FIG. 7C is a conceptual view when thinning interval of the dots is larger than that of FIG. 7A.

If the metallic ink is thinned when the metallic image is formed, the metallic image is unclear even if the line width of the outline is made small when the thinning gap of the metallic ink dots are small. For example, when the dots are thinned in a streak pattern, assuming that the dot thinning gap shown in FIG. 7A is a common thinning gap, when the thinning gap is smaller than the common thinning gap, the ratio of the metallic ink dots in the pixels adjacent to the outline is larger than a common ratio. Therefore, the amount of the metal particles adjacent to the outline is not insufficient, even the outline of the metallic image becomes not easily dim, even though the width of the outline itself is smaller. That is, as shown in FIG. 7B, even if the width of the outline itself is small, the entire metallic image is seen clear.

When the width of the outline is excessively small, the absolute amount of the metal particles is insufficient on the outline, such that it is difficult to achieve sufficient metallic luster, and accordingly, it is necessary to set a lower limit value for the width of the outline. The lower limit value is set in accordance with the properties of the metallic ink or the thinning pattern.

On the contrary, when the thinning gap of the dots is large, the metallic image becomes unclear unless the width of the outline is large. For example, when the dots are thinned in a streak pattern and the thinning gap is lager than the common thinning gap, the ratio of the metallic ink dots in the pixel adjacent to the outline is smaller than the common ratio. Therefore, the amount of the metal particles adjacent to the outline is insufficient, such that the outline is dim and the entire metallic image may become unclear. As shown in FIG. 7C, the width of the outline itself is large, such that the metallic image is prevented from being unclear.

Image Forming Process

A method of a detailed image forming process of the first embodiment is described. In general, although a color image may be formed with a metallic image in metallic printing, as described above, a processing of a metallic image when both images have no overlap is described in the embodiment.

FIG. 8 is a view showing the flow of a printing process in the first embodiment of the invention. The printing process is implemented by performing the processes of S101 to S107. The processes are performed on the basis of instructions from the printer driver installed in the computer 110.

The printer driver receives data of the original image from an application program and converts the data into print data having a format that the printer 1 can analyze, and outputs the print data. The print data includes data (pixel data) showing the ejection amount of ink for each pixel and an image of formed by a plurality of ink dots by ejecting the ink to the position of the pixels from the head unit of the printer 1 in accordance with the print data.

Further, the printer driver may be installed in the controller 60 of the printer 1 such that an image forming process is performed by the printer 1.

When the data of the original image is converted into the print data, the printer driver performs a resolution converting process, a color changing process, a halftone process, and a rasterizing process. Further, the metallic ink dots inside the outline of the metallic image are thinned by the processes described below (S105: determining whether there is a metallic image and S106: a dot thinning process). Hereafter, various processes performed by the printer driver are described in detail.

Before printing is started, the printer 1 is connected first to the computer 110 (see FIG. 1), the printer driver stored in a CD-ROM included in the printer 1 (or a printer driver downloaded from the homepage of the manufacturer of the printer) is installed in the computer 110. The printer driver is provided with a code for executing the processes of FIG. 8 in the computer. Further, as described above, the printer driver may be installed in the controller 60 of the printer 1.

When a user gives an instruction of printing from an application program and printing is started, the printer driver is called and receives image data (original image data) to print from the application program (S101), and then a resolution converting process is performed on the image data (S102).

The resolution converting process (S102) is a process of changing the resolution of the image data (text data, image data, or the like) to a resolution for printing on a medium. For example, when the print resolution is set at 720×720 dpi, the image data of a vector format received from the application program is converted into image data of a bitmap format having a resolution of 720×720 dpi. Further, the image data after the resolution converting process is composed of data of gradation (for example, 256 gradation) shown by RGB color spaces (RGB indicate each color of red (R), green (G), and blue (B)) when there is data and a color image having gradation (for example, 256 gradation) shown by a metallic (Me) color space.

Next, the printer driver performs the color changing process (S103). The color changing process is a process of converting the image data to fit to the color space of the ink color of the printer 1. In this embodiment, image data of an Me+RGB color space is converted into image data of Me+KCMY color space. Since the metallic ink color (Me) cannot be expressed by a combination of KCMY (KCMY indicates the colors of black (K), cyan (C), magenta (M), and yellow (Y), respectively), it is handled as a specific color and the color changing process is not performed. Accordingly, this process may not be performed when the print target is only a metallic image. The color changing process for a color image is performed on the basis of 3D-LUT that connects the gradation value of RGB data with the gradation value of KCMY data. Therefore, an image data of KCMY color space is acquired. Further, the image data after the color changing process is 8-bit data having 256 gradation shown by the Me+KCMY color space.

After the color changing process (S103), the printer driver performs the halftone process (S104). The halftone process is a process of converting data having a high gradation number into data having a low gradation value that can be formed by the printer 1. In this embodiment, print image data having 256 gradation is converted into 1-bit data showing 2 gradation or 2-bit data showing 4 gradation. A method of the halftone process, a dither method and an error diffusion method have been known and those halftone processes are performed in the embodiment. The data that has undergone the halftone process has a resolution equivalent to the recording resolution (for example, 720×720 dpi). In the image data after the halftone process, 1-bit or 2-bit pixel data corresponds to each pixel, such that the pixel data is data showing the dot-forming situation (whether there is a dot and the size of the dot) in the pixels.

Next, the printer driver determines whether there is a metallic image before the dot thinning process is performed, on the image data after the halftone process (S105). In the embodiment, it is assumed that an image including a metallic image is formed, but the printing may be performed in accordance with the methods in the related art, for common color printing not including a metallic image. That is, it is not necessary to perform the dot thinning process. Therefore, when a metallic image is included in the print target image data as the result of determining whether there is a metallic image in this process, the process proceeds to the dot thinning process (S106), and when a metallic image is not included, the process proceeds to the rasterizing process (S107).

When it is determined that a metallic image is included in the image data after the halftone process (S105), the dot thinning process is performed on the metallic image (S106). The dot thinning process is a process of creating data for ejecting metallic ink to the pixels that are the thinning targets, by thinning some dots in the pixels inside the pixels on the outline of the metallic image (pixel data for forming dots). That is, An image is formed by ejecting metallic ink to be smaller than the amount of metallic ink shown by the original pixels, at some of the pixels inside the pixels on the outline of the image formed with the metallic ink.

The detailed method of the dot thinning process (S106) is described below.

Next, the printer driver performs the rasterizing process (S107). The rasterizing process is a process of changing the arrangement order of pixel data on image data in the order of data to be transmitted to the printer 1. For example, the pixel data is arranged in accordance with the arrangement order of the nozzles in the nozzle lines. Thereafter, the printer data driver creates image data by adding pixel data to control data for controlling the printer 1 and transmits the print data to the printer 1.

The printer 1 performs a printing operation in accordance with the received print data. In detail, the controller 60 of the printer 1 controls the transporting unit 20 in accordance with control data of the received image data and ejects the metallic ink (and color ink) from the nozzles in the head 41 by controlling the head unit 40 in accordance with the image data of the print data, thereby forming an image on the medium.

Detail of Dot Thinning Process (S106)

The dot thinning process (S106) is described in detail. As described above, in the embodiment, some dots are thinned in the region inside the outline of the metallic image (hereafter, also called a dot thinning region). Accordingly, a metallic image with favorable metallic luster and color tone is printed by adjusting the amount of the dots of metallic ink ejected on the thinning region. Therefore, it is necessary to create data for thinning metallic ink dots from predetermined pixels in the pixels where the metallic ink dots are ejected. The printer driver specifies pixels that are the thinning targets in the pixel data of the printed metallic image and actually performs the dot thinning process.

Figure 9:
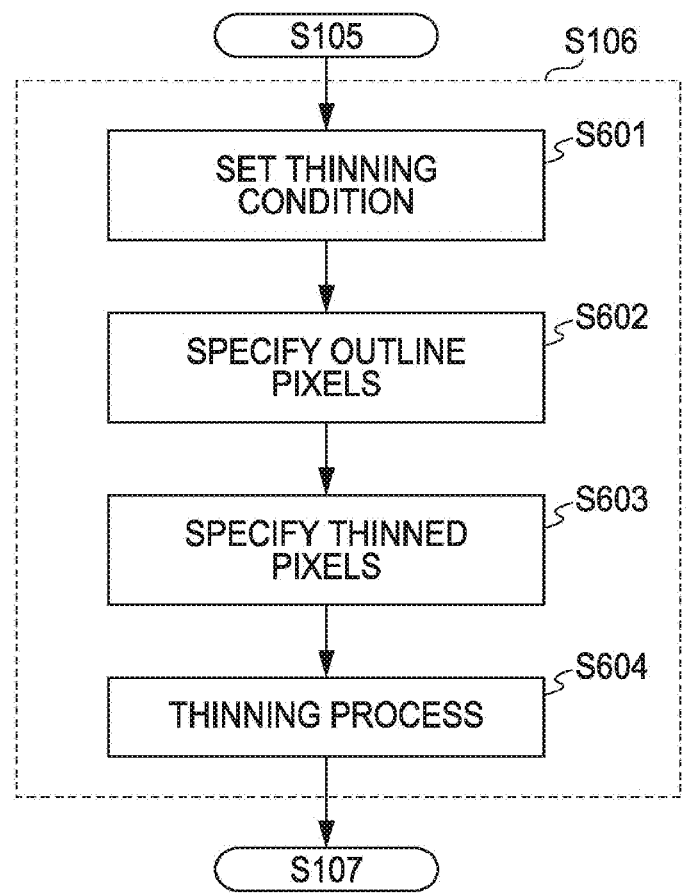
FIG. 9 is a view showing the flow of a dot thinning process in the first embodiment of the invention.
Figure 10A:
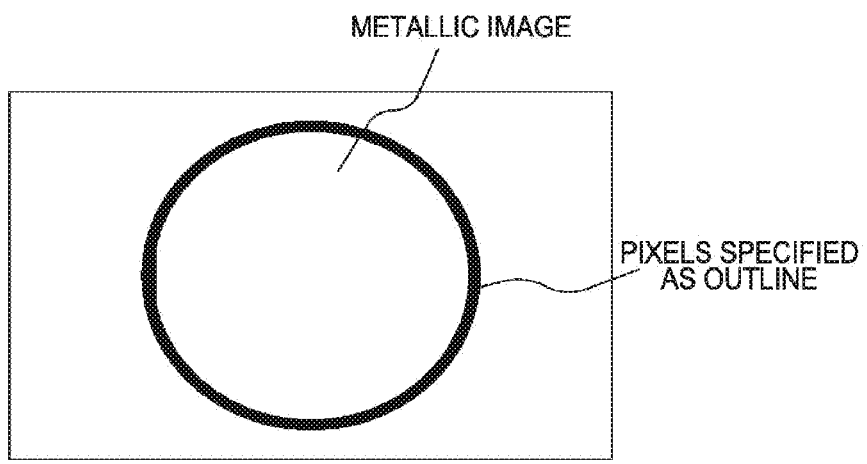
FIGS. 10A to 10C are views illustrating a method of specifying the thinning pixels of a metallic image in a streak pattern.
Figure 10B:
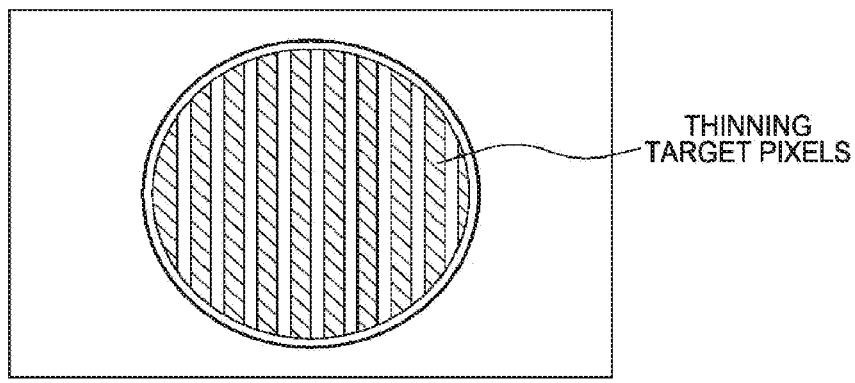
Figure 10C:
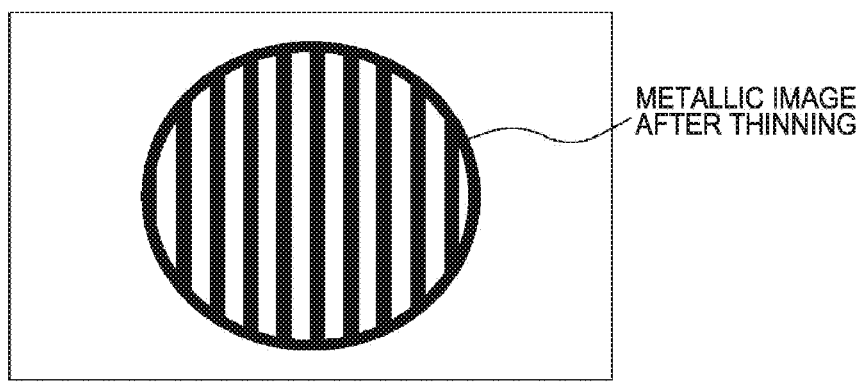

Hereafter, the detailed method of the dot thinning process when the thinning pattern is in the streak shape illustrated in FIG. 5B is described. FIG. 9 shows a flow of the dot thinning process. Further, FIGS. 10A to 10C are views illustrating a method of specifying thinning pixels as a streak pattern. The dot thinning process (S106) is performed sequentially performing the processes of S601 to S604.

First, a user determines a dot thinning pattern and sets thinning conditions, such as the thinning width, the thinning gap (number of pixels) (S601). For example, the patterns are set in advance as in FIGS. 5B to 5D such that the user can select a desired thinning pattern though a user interface (not shown). Similarly, the thinning gap of dots or the thinning gap of dots is also predetermined in advance such that it is possible to change the setting through the user interface (not shown).

Next, the printer driver specifies pixels on the outline of the metallic image (S602). The deep-colored portion in FIG. 10A indicates the pixels on the outline of the metallic image, which are specific pixels, and the portion is not the dot thinning portion. As the pixels on the outline, several pixels inside from the outermost pixels of the image, in the pixels constituting the metallic image data are specified. The outermost pixels of the metallic image can be extracted by performing a filtering process using Laplacian filter on the image data of the original image. Several kinds of widths of the outline (number of pixels) are stored in a memory 63, as default values and the printer driver selects the optimum set value in accordance with the thinning width and the thinning gap set in S601. Further, it may be possible to allow the user to freely change the setting through the user interface. In this case, it is necessary to set a lower limit value in the width of the outline.

Next, thinning target pixels are specified in accordance with the set dot thinning pattern and the thinning width·thinning gap (number of pixels), for the pixels (thinning region) except for the pixels on the outline, in the metallic image data (S603). FIG. 10B shows when a streak thinning pattern is selected, in which the hatched portions in the pixels inside the outline of the metallic image are specified as thinning target pixels of the metallic pixels. Further, image data where the thinning process is finished in a streak shape is created by changing the gradation value on the pixel data into zero, for the specified thinning target pixel (S604). Accordingly, in the thinning region, it is possible to achieve the metallic print data shown in FIG. 10C in which pixel lines of which the Me gradation value is not zero (the pixel lines where metallic ink is ejected) and pixel lines where the Me gradation value is zero (pixel lines specified as the thinning target) are alternately arranged in a streak shape, in the thinning region.

Further, the dot thinning method for the thinning pattern shown in FIG. 5 or 5D is the same as for the streak pattern of FIG. 5B. That is, the thinning target pixels of the metallic image for the thinning region, except for the pixels on the outline, are specified by specifying the pixels on the outline by the metallic image data, thereby performing the actual thinning process.

The setting of the thinning target region may be performed by the user changing the setting of the thinning gap or the thinning width on the user interface (not shown) after ascertaining the actually printed image.

Figure 11A:
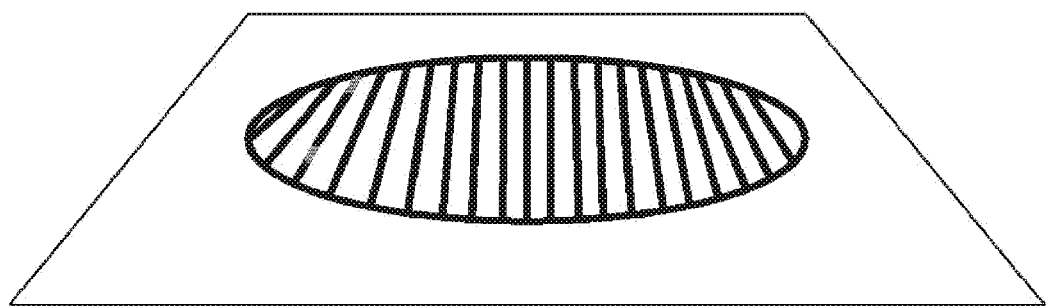
FIGS. 11A and 11B are view illustrating an example when a thinning pattern of dots is changed.
Figure 11B:
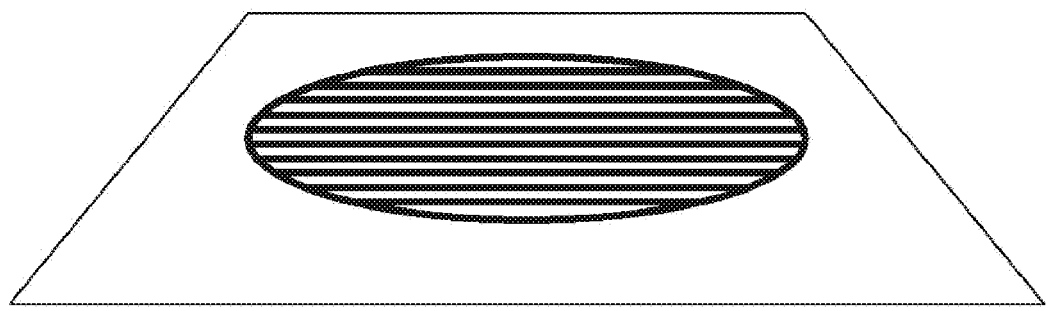

Further, it is also possible to change the thinning pattern in consideration of the angle when seeing the printed image. FIGS. 11A and 11B show examples of changing the dot thinning pattern. For example, when the printed image is seen from below, the printed image is seen not as the vertical streak shape shown in FIG. 11A (corresponding to FIG. 5A), but as the horizontal streak shape shown in FIG. 11B. When the image is checked at the angles shown in FIGS. 11A and 11B, the gap between the streaks is difficult to be seen in the vertical streaks (FIG. 11A) in comparison to the horizontal streaks (FIG. 11B), such that it is possible to reduce the influence of the dot thinning. The thinning pattern can also be changed by the user through the user interface.

Effect of First Embodiment

In the embodiment, metallic ink is thinned and ejected to some of the pixels inside from the pixels on the outline of a metallic image. The metallic ink is ejected, without being thinned, to the pixels on the outline.

Accordingly, it is possible to print a metallic image as a clear image with favorable metallic luster and color tone and a clear outline. Further, since the amount of ejected link inside the outline of the metallic image is small, it is possible to decrease the total amount of the ink used for the printing and reduce the printing cost.

Second Embodiment

In the second embodiment, when metallic printing is performed by using metallic ink and color ink, an image is printed such that a metallic image and a color image have an overlap. The configuration of the printer 1 is the same as that in the first embodiment.
Printing Target Image FIG. 12 is a conceptual view of an image printed by the embodiment. The image (original image) that is the printing target in the embodiment, as shown at the left in FIG. 12, has a metallic image portion (circular portion in the figure) that is printed with the metallic ink and a color image portion (rectangular shape in the figure) that is printed with the color ink. Further, both images are formed to have an overlap in the hatched region in the figure. Further, the color image is shown by three colors of RGB and printed with four colors of KCMY in printing.

For the description, it is assumed that the original image is divided into two layers of a layer (metal layer) where the metallic image is formed and a layer (color layer) where the color image is formed. The color layer can be actually divided into images with three colors of RGB, but it is assumed that the cooler layer is implemented by one-color image below. As shown at the right in FIG. 12, the original image that is the printing target is formed by overlapping the metal layer and the color layer.

In the embodiment, a metallic image is formed first on a medium by printing the metallic image shown on the metal layer. Further, after the metallic image is formed, the color image shown on the color layer is printed to overlap the metallic image.
Printing Process The printing process for a metallic image in the second embodiment is completely the same as that in the first embodiment. After printing is started, a metallic image that has undergone the thinning process is performed first. Thereafter, a color image is printed to overlap the metallic image. When the metallic image is printed, the dot thinning process is not performed on the outline and the dot thinning process is performed on the inside of the outline. Meanwhile, the color image is printed without the dot thinning process.

Further, it is necessary to print the color image after ensuring a sufficient drying time after printing the metallic image such that the metallic ink of the metallic image, which is previously printed, and the color ink of the color image are not mixed and spread.

Effect of Second Embodiment

In the second embodiment, it is possible to implement a metallic color (for example, metallic blue or metallic red) by printing the color image on the metallic image. In common printing, when too many metal particles are contained in the metallic image, the gradation of the color image formed thereon is removed, such that metal color becomes dark. However, in the embodiment, favorable gradation is implemented and the outline of the metallic image is excepted from the thinning target by thinning the dots inside the outline of the metallic image, such that it is possible to make the shape of the metallic image itself clear and perform metallic printing with a high image quality.

Third Embodiment

In the third embodiment, when an image is printed such that a metallic image and a color image have an overlap, in metallic printing, the printing is performed such that the metallic ink and the color ink are not simultaneously ejected to the pixels. That is, the printing is performed such that the metallic ink dots and the color ink dots, which are formed on the medium, do not overlap each other in a pixel unit.

In the second embodiment, as shown at the right in FIG. 12, the metallic image is formed first and then the color image is formed on the metallic image. However, it is necessary to perform printing two times, the printing of the metal layer and the printing of the color layer, such that the time for finishing the printing increases in comparison to common color printing using only color ink.

In the third embodiment, when the metallic image and the color image have an overlap, printing is finished at one time by preventing the ink from coming in contact with each other at the overlap. Accordingly, it is possible to reduce the time for printing without deteriorating the quality of the printed image.

Printing Process

The basic flow for the printing process is the same as that illustrated in FIG. 8 for the first embodiment. However, in the embodiment, the progression of the dot thinning process (S106) is different to prevent the ink dots from overlapping each other, at the overlap of the color image and the metallic image. Hereafter, the differences from the embodiments described above in the dot thinning process (S106) are mainly described.

Detail of Dot Thinning Process (S106)

As described above, in the embodiment, a metallic image and a color image are simultaneously printed by preventing the metallic ink dots and the color ink dots from being simultaneously ejected onto a medium, in the region where the metallic image and the color image overlap each other (hereafter, referred to as an overlap region). Therefore, it is necessary to thin the print data of the color ink dots for the pixels where the metallic ink dots are ejected and thin the print data of the metallic ink dots for the pixels where the color ink dots are ejected.

Figure 13:
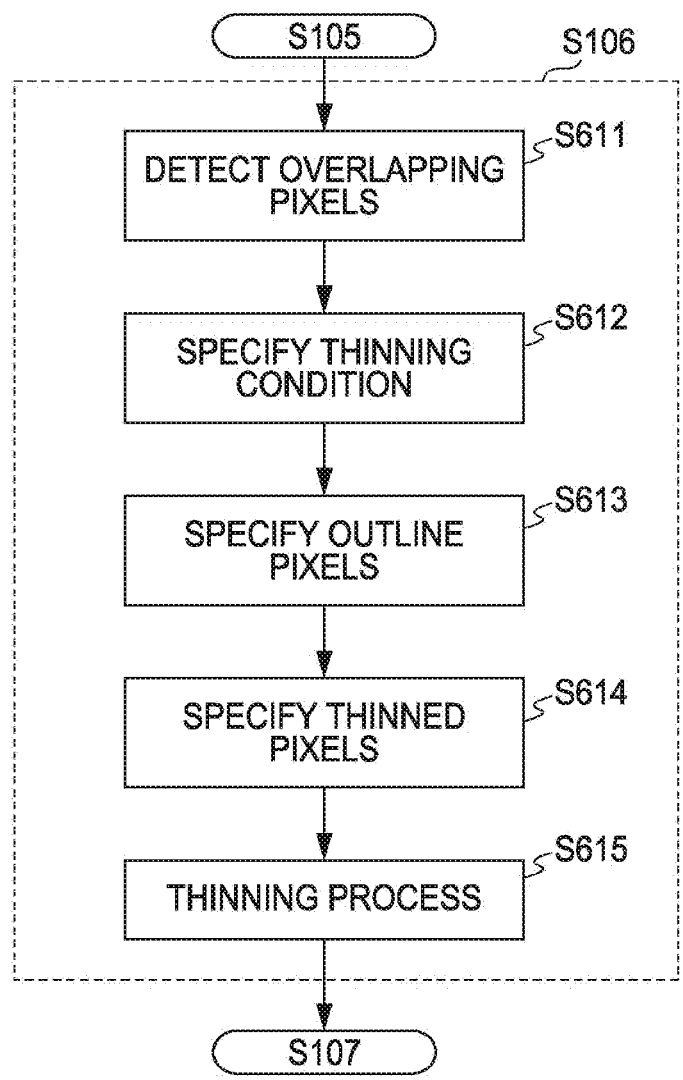
FIG. 13 is a view showing the flow of a dot thinning process in a third embodiment.

FIG. 13 shows a flow of a detailed process of the dot thinning process in the third embodiment. The dot thinning process (S106) is performed sequentially performing the processes of S611 to S615.

S611: Detection of Overlapping Pixels

First, whether there is an overlap region between the metallic image and the color image is determined and an overlap region (overlapping pixels) is detected, for the original image data. When an overlap region (pixels) is not detected even if the original image includes the metallic image and the color image, the dot thinning process is not preformed only on the metallic image, as in the first embodiment (see FIG. 9). Meanwhile, when there are overlapping pixels, the region is detected and the process for predetermined dot thinning is performed on the pixel data.

The fact that the metallic image and the color image overlap each other means that the positions of the pixels showing the metallic image for the metal layer (pixels having gradation except for zero for Me) and the positions of the pixels showing the color image for the color layer (pixels having gradation except for zero for at least one color of RGB) overlap each other. For example, when the gradation value of the Me is 128 and the gradation value of R is 256 for a pixel A, the metallic image and the color image overlap each other in the pixel A. For example, when the gradation value of the Me is 64 and the gradation value of RGB is 0 for a pixel B, the metallic image and the color image do not overlap each other in the pixel B.

The printer driver detects overlapping pixels between the metallic image and the color image by comparing the gradation value of Me with the gradation value of RGB for each pixel, from the image data after the process S105. When overlapping pixels are detected, the position information of the overlapping pixels is temporarily stored in the memory 63 and the process proceeds to a thinning condition setting (S612), which is the next process.

S612: Thinning Condition Setting

The dot thinning pattern is determined for the metallic image in the detected overlap region, similar to S601 of FIG. 9 described above. Further, the thinning width and the thinning gap are set.

S613: Specifying Outline Pixel

Specifying the outline pixels is performed basically the same as the process described in S602 (see FIG. 9). That is, outline pixels of the metallic image are extracted and the width of the outline is determined on the basis of the conditions set in S612, thereby the outline pixels as the outline pixels except for the thinning target. However, since the metallic image and the color image has an overlap in the embodiment, it is necessary to how to process the outline pixels of the color image, in addition to the outline pixels of the metallic image at the overlap.

FIGS. 14A to 14D are views illustrating a method of processing the outline of a color image at the overlap between a color image and a metallic image.

Figure 14A:
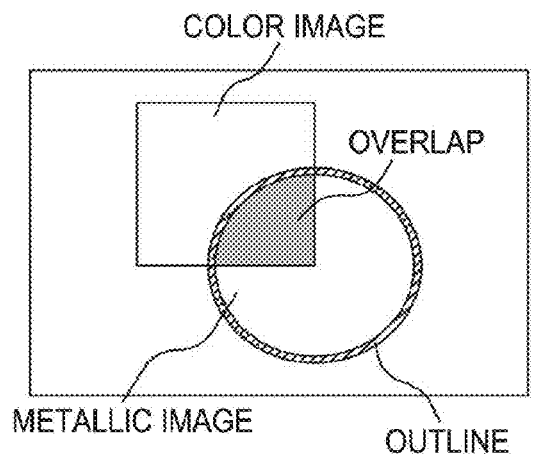
FIGS. 14A to 14D are views illustrating a method of processing the outline of a color image at the overlap between a color image and a metallic image.

As shown in FIG. 14A, when there is a region where the color image (rectangular portion) and the metallic image (circular portion) overlap each other, the outline of the metallic image is specified first. The region that is hatched in FIG. 14A indicates the pixels specified as the outline of the metallic image. Since the outline remains as a non target of the dot thinning process, the metallic image is seen clean even in the region where the color image and the metallic image overlap.

Meanwhile, in the embodiment, as described below, at the overlap between the metallic image and the color image, the metallic ink dots are thinned at the pixels formed by the color ink dots and the color ink dots are thinned at the pixels formed by the metallic ink dots. That is, not only the metallic image, but the color image is considered as the target of the thinning process, at the overlap. Therefore, when printing is performed with the outline of the color image emphasized at the overlap, the outline of the color image is also specified as pixels that are not a target of thinning, similar to the outline of the metallic image.

Figure 14B:
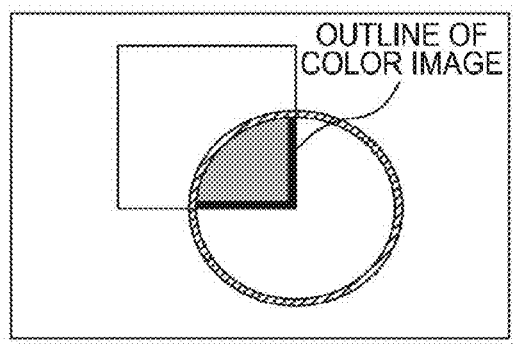

FIG. 14B shows when the outline of the color image is specified at an overlap. The deep color portion in the figure indicates pixels specified as the outline of the color image. Accordingly, the outline is not a target of thinning of the color ink dots, such that it is possible to clearly print the color image. Further, extracting the pixels on the outline of the color image is performed by various filtering processes, in the same method as the outline extracting process of the metallic image described above, for the pixel data of the color layer.

Figure 14C:
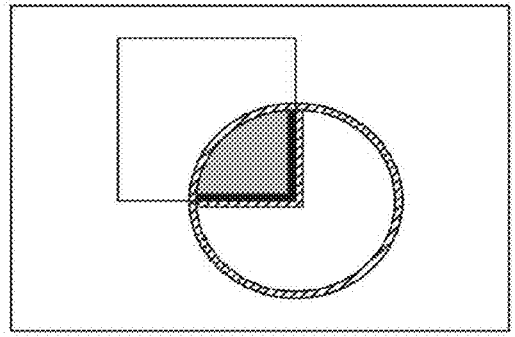

Further, the portion circumscribing the outline of the color image at the overlap may be considered as the outline of the metal image. For example, as shown in FIG. 14C, the portion (hatched portion) being in contact with the outline (colored portion) of the color image is extracted as the outline of the metallic image, such that it is possible to perform clear printing by harmonizing the interface of the metal image and the color image.

Figure 14D:
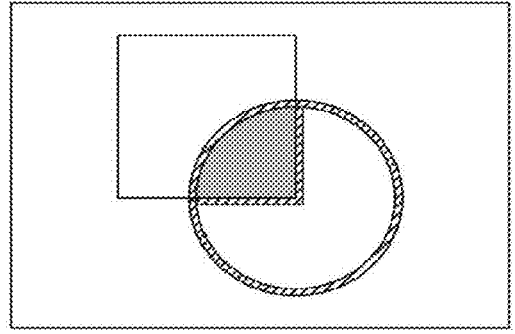

Further, in order to make the interface of the color image clear by emphasizing only the outline of the metallic image, it may be possible to extract the outer circumference of the metallic image and the portion circumscribing the outline of the color image as the outline of the metallic image, as shown in FIG. 14D.

S614·415: Specifying·Thinning Process of Thinning Pixel

In the third embodiment, pixels that is the thinning targets are specified for the metallic image data and the color image data and the thinning process of the pixel data is actually performed. The targets of the thinning are predetermined pixels except for the outline pixels specified as the thinning target in S613 in the pixels in the overlap detected in S611.

In the embodiment, it is necessary to thinning the pixels at different positions for the metallic image data and the color image data in order to create print data for ejecting the metallic ink and the color ink to overlap each other on the same pixel. For example, when the pixel C at a predetermined position in the overlap region of the color image is specified as a thinning target in the metallic image, it is not necessary to thinning the same pixel C for the color image. Similarly, when the pixel D at a predetermined position in the overlap region of the metallic image is specified as a thinning target in the color image, it is not necessary to thinning the same pixel D for the metallic image. That is, when it is possible to specify the pixels that are the thinning targets for any image of the metallic image and the color image, it is possible to specify pixels that are the thinning targets for the other image.

Figure 15A:
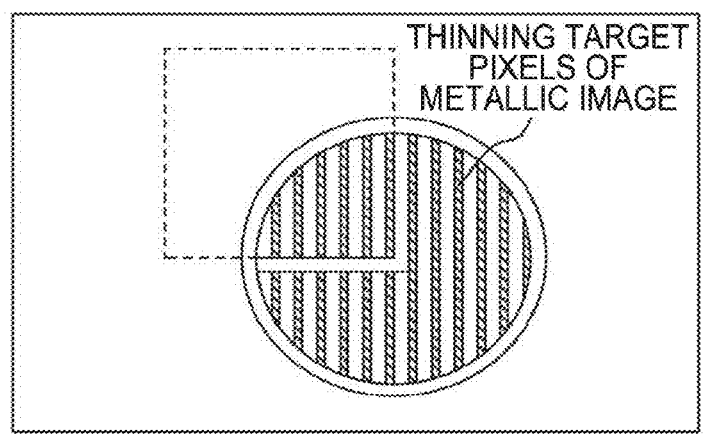
FIGS. 15A to 15C are views illustrating a method of specifying thin pixels in a streak shape.
Figure 15B:
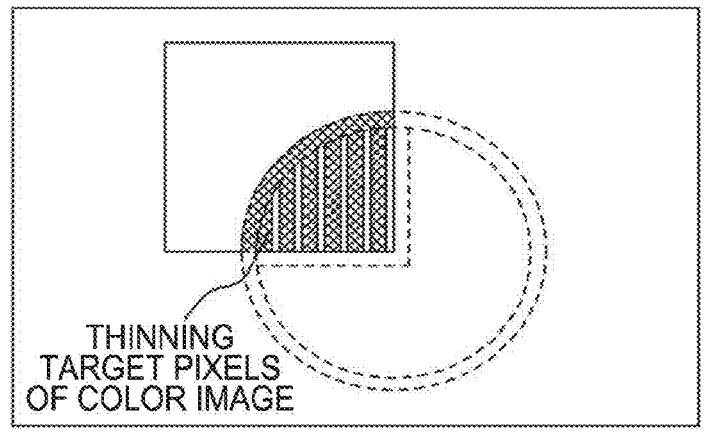
Figure 15C:
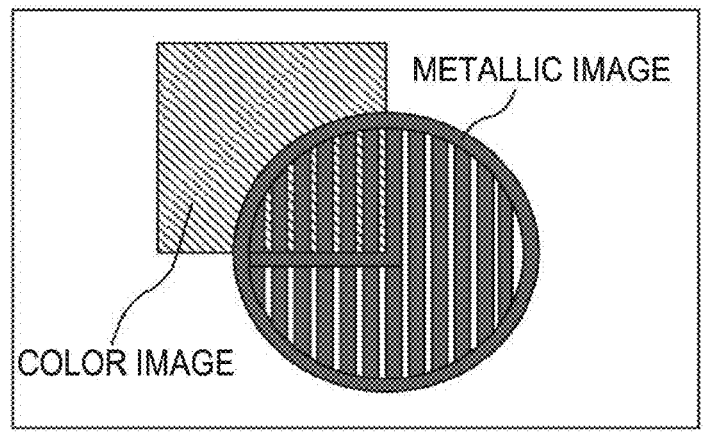

An example of creating print data of printing a streak thinning pattern shown in FIG. 5B is described. FIGS. 15A to 15C are views illustrating a method of specifying thinning pixels in a streak shape. Further in S613, as shown in FIG. 14D, specifying the outline pixels is described.

FIG. 15A shows when thinning target pixels in a metallic image are specified. In S613, the region of the (circular) outer circumference of the metallic image and the region circumscribing the (rectangular) outline of the color image are specified as the outline pixels of the metallic image. The printer driver specifies the thinning target pixels with several pixel line gaps in accordance with the thinning width and the thinning gap in S612 from the pixels except for the outline pixels in the pixels in the overlap of the metallic image, for the metal layer. As a result, the hatched portion in the metallic image shown in FIG. 15A is specified as the thinning target pixels of the metallic image.

Next, for the color layer, all of the pixels except for the pixels specified as the thinning targets in the metallic image (the pixels specified in the hatched portion in FIG. 15A) in the pixels in the overlap region of the color image are specified as the thinning target. In the color image shown in FIG. 15B, the hatched portion indicates the thinning target pixels of the color image. In other words, in the overlap region, all of the pixels specified as the pixels where the metallic ink is ejected are specified as the thinning target pixels of the color image. Accordingly, the color image data making the overlap region in a streak shape (shape inversing the streak shape of the metallic image) is acquired.

By combining the data, for the overlap region, image data (FIG. 15C) that prevent the positions of the pixels where the metallic ink dots are ejected and the positions of the pixels where the color ink dots are ejected from overlapping each other.

Effect of Third Embodiment

In the third embodiment, overstrike printing allowing the metallic image and the color image to have an overlap is performed, the color ink dots and the metallic ink dots are prevented to be ejected to the same pixel. In common overstrike printing, it was necessary to form a color image on a metallic image after forming (printing) the metallic image first. Therefore, printing was necessary to be performed at least two times and it was difficult to eject color ink until the metallic image that is the base is dried, such that it takes a long time to finish the printing.

According to the printing method of the embodiment, even though the metallic image and the color image overlap each other, it is possible to simultaneously print the metallic image and the color image while making the metallic image seen clear. Further, for the overlap, as the pixels of the metallic image are thinned in a lattice shape, the color image is formed at the thinned portion, such that it is possible to for a metallic image with the same color tone as when a color image is formed on a metallic image. Therefore, it is possible to further reduce the printing time than the method of the related art, without deteriorating the image quality.

Further, as the metallic image overlaps the color image in the related art, the color (metallic luster) of the metallic image may be darkened. However, in the embodiment, since printing is performed such that the color ink dots and the metallic ink dot do not overlap each other, the color of the metallic image is suppressed from darkening.

Fourth Embodiment

In the fourth embodiment, the outline of the metallic image is also a thinning target. In the embodiments described above, metallic ink dots are formed throughout the outline by extracting the outline of the metallic image in the dot thinning process (process of S106 in FIG. 8) and ejecting metallic ink to the extracted outline as the pixels except for the thinning target. However, when the metallic image is seen clear, the outline may be a target of dot thinning.

In the embodiment the dot thinning process is also performed on the outline of the metallic image. However, when the dots are thinned at the same ratio as the region inside the outline, the outline becomes unclear and the image quality of the metallic image is deteriorated, such that dot thinning is adjusted for the outline. That is, printing is performed by thinning the dots from the pixels of the outline such that the dot thinning ratio is smaller than the dot thinning ratio in the region inside the outline of the metallic image.

The process of dot thinning (S106) in the printing process illustrated in FIG. 8 is different in the fourth embodiment from the embodiments described above. Hereafter, the differences from the embodiment described above are described. Further, similar to the first embodiment, only the metallic image is described and the color image is not described.

Dot Thinning Process in Fourth Embodiment

Figure 16:
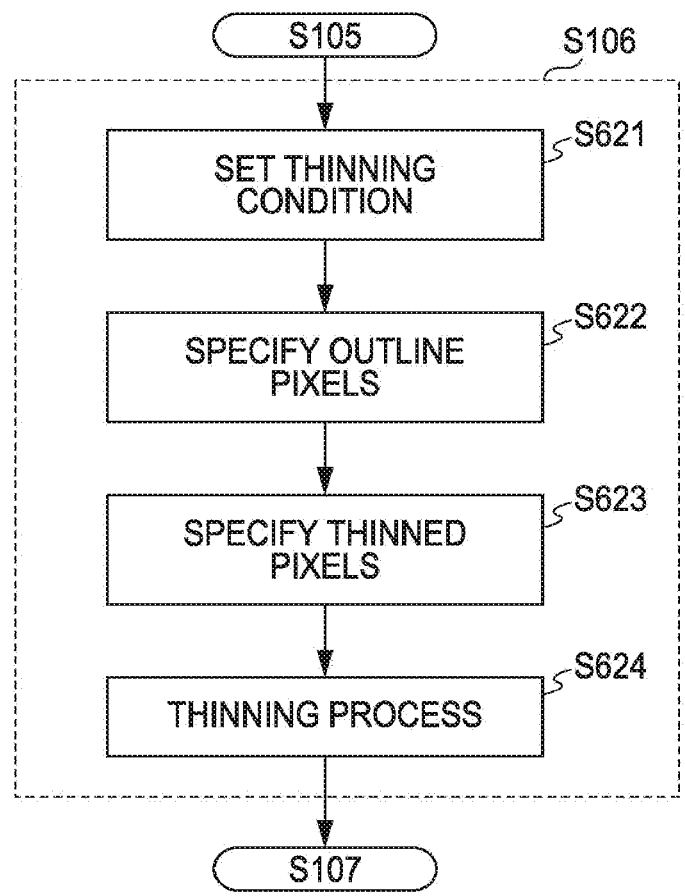
FIG. 16 is a view showing the flow of a dot thinning process in a fourth embodiment.

Differences from FIG. 9 described in the first embodiment are described. FIG. 16 shows a flow of a detailed process of the dot thinning process in the fourth embodiment. The dot thinning process (S106) is performed sequentially performing the processes of S621 to S624 in the embodiment.

First, in the process of setting thinning conditions (S621), thinning conditions are set for the outline, in addition to the inside of the outline. In detail, the dot thinning ratio is set such that the amount of metallic ink per unit area which is ejected to the outline is larger than the amount of metallic ink per unit which is ejected to the region inside the outline. For example, when the dot thinning ratio for the region inside the outline is 30%, the dot thinning ratio for the outline is 15%. As described above, the condition of dot thinning of the outline is set as the ratio to the dot thinning ratio for the region inside the outline.

Further, the dot thinning pattern for the outline is set to be the same as the dot thinning pattern for the region inside the outline, but a user may change the dot thinning pattern for the outline through the user interface.

Thereafter, specifying outline pixels (S622), specifying dot thinning pixels (S623), and a thinning process (S624) are sequentially performed. The processes are the same as the processes of S602 to S604, respectively.

Therefore, as the dots are thinned in the region inside the outline, a metallic image with dots thinned smaller than the region inside the outline is formed on the outline.

Effect of Fourth Embodiment

In the fourth embodiment, printing is performed such that the dot thinning ratio for the region inside the outline is smaller than the dot thinning ratio for the outline in the metallic image.

Accordingly, it is possible to print a metallic image as a clear image with favorable metallic luster and color tone and a clear outline. Further, it is possible to further save the metallic ink used in the printing by thinning the metallic ink dots even for the outline.

Fifth Embodiment

In the fifth embodiment, a dot thinning process is performed on all of the pixels in the metallic image. Further, a new outline is formed by ejecting metallic ink to the outer circumference of the metallic image. Accordingly, a metallic image with the dots thinned at the inside region and not thinned at the outside is formed.

The process of dot thinning (S106) in the printing process illustrated in FIG. 8 is different in the fifth embodiment from the embodiments described above. Hereafter, the differences from the embodiment described above are described.

Dot Thinning Process in Fifth Embodiment

Figure 17:
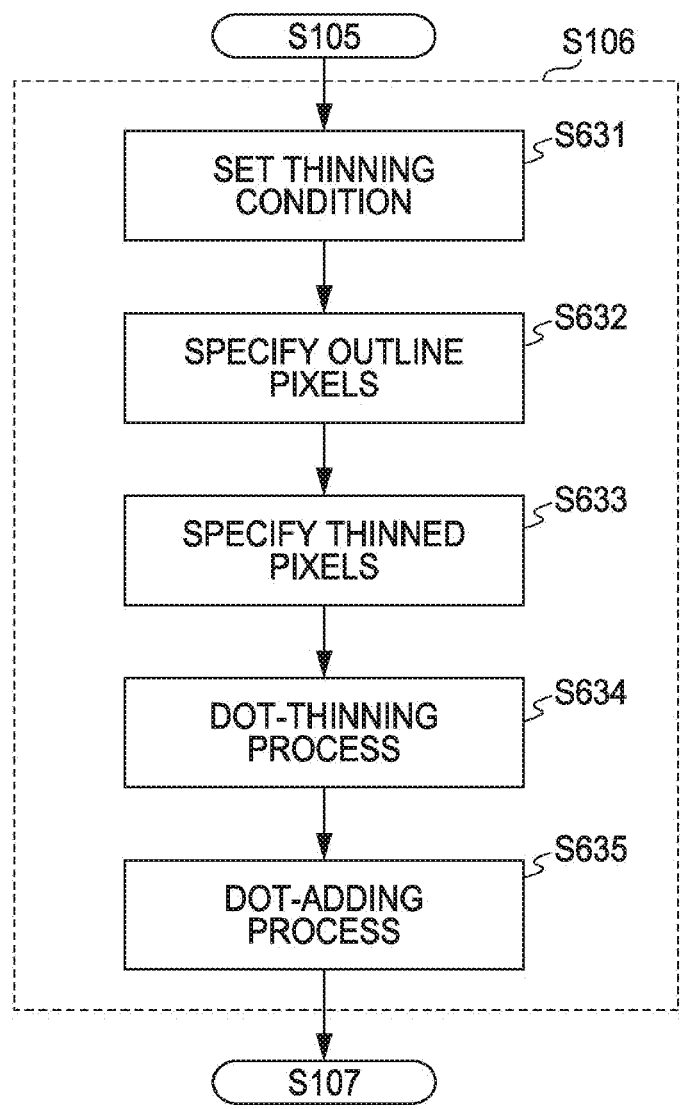
FIG. 17 is a view showing the flow of a dot thinning process in a fifth embodiment.

FIG. 17 shows a flow of a detailed process of the dot thinning process in the fifth embodiment. The dot thinning process (S106) is performed sequentially performing the processes of S631 to S635 in the embodiment.

A user sets the dot thinning pattern, dot thinning width, and the dot thinning gap of a metallic image first, for the setting of the thinning condition (S631).

Next, the pixels outside as much as one pixel from the pixels at the outermost outline of the metallic image (hereafter, also called outline-outside pixels) are extracted. The outline-outside pixels can be extracted by performing a filtering process with a filter for extracting the outline-outside pixels, for the image data of the metallic image. The pixels in the width of several pixels at the outer side, including the outline-outside pixels, are specified as additional outline pixels (S632). In an outline adding process (S635) described below, a new outline is formed in the metallic image by creating data for extracting metallic ink to the additional outline pixels. Further, the width (number) of the additional outline is determined by the printer driver on the basis of the dot thinning condition set by the user in S631, but it may be set by the user. However, in this case, since the metallic image is unclear when the width of the outline is too small, a lower limit value is provided for the width of the additional outline pixels, similar to the first embodiment.

Thereafter, the thinning process is performed (S634) by specifying the thinning pixels for all of the pixels in the metallic image (S633).

Finally, dots are newly added to the additional outline pixels specified in S632 (S635). Accordingly, in the original image, the dots are thinned with a predetermined ratio throughout the front of the metallic image, metallic image data with a new outline added in the outline-outside pixels on the metallic image is created.

Effect of Fifth Embodiment

In the fifth embodiment, the entire region of the metallic image is also a thinning target. Further, pixels forming the new outline are set outside the outer circumference of the metallic image (at the outline-outside pixels) and metallic ink is ejected to the new outline.

Accordingly, it is possible to print a metallic image as a definite image with favorable metallic luster and color tone and the portion, which is the new outline, seen clean.

Further, as the new outline is added outside the metallic image of the original image, a metallic image larger by one to several pixels than the original image is formed. However, since the metallic ink dots are thinned at a predetermined ratio throughout the region of the metallic image of the original image, the metallic image becomes unclear unless the outline is emphasized, such that the image quality is deteriorated. Therefore, when a definite metallic image can be printed, it does not a matter even if the image is slight increased in size by adding the outline.

Sixth Embodiment

In the sixth embodiment, a dot thinning process is performed on all of the pixels in the metallic image. Further, an outline is formed again by moving some of dots in the pixel on the outer circumference of the metallic image.

For the entire metallic image, for example, as shown in FIG. 6A, when the dot thinning process is formed in a streak shape, the outline of the metallic image is disconnected, such that the metallic image becomes unclear. In the embodiments described above, printing is performed such that the metallic image is seen clean by excepting the outline from the dot thinning target or forming a new outline. In the embodiment, the metallic image is made seen clean by forming a new outline by moving the dots from other pixels such that a disconnected portion is not generated in the outline.

Figure 18A:
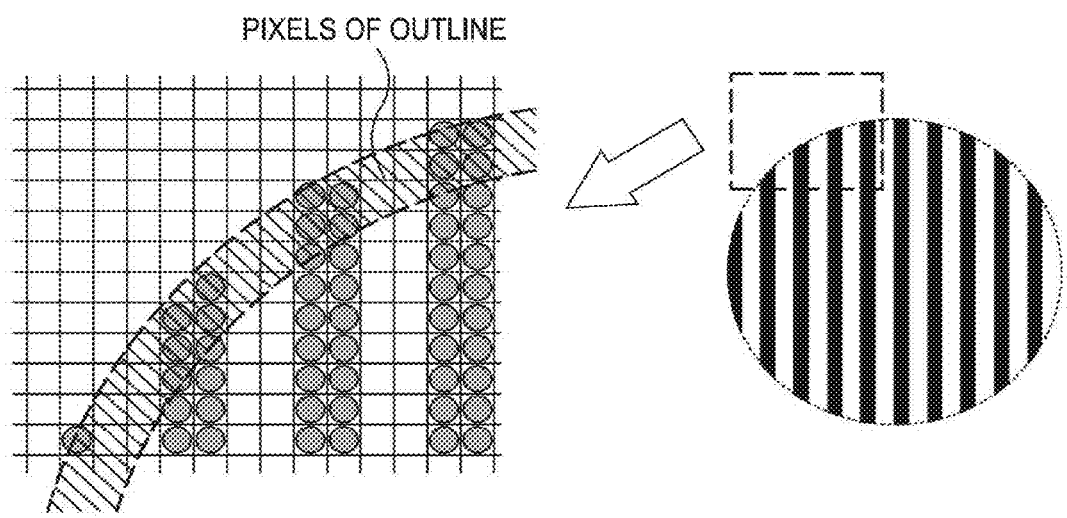
FIGS. 18A and 18B are views illustrating a metallic image formed in a sixth embodiment and the outline thereof.
Figure 18B:
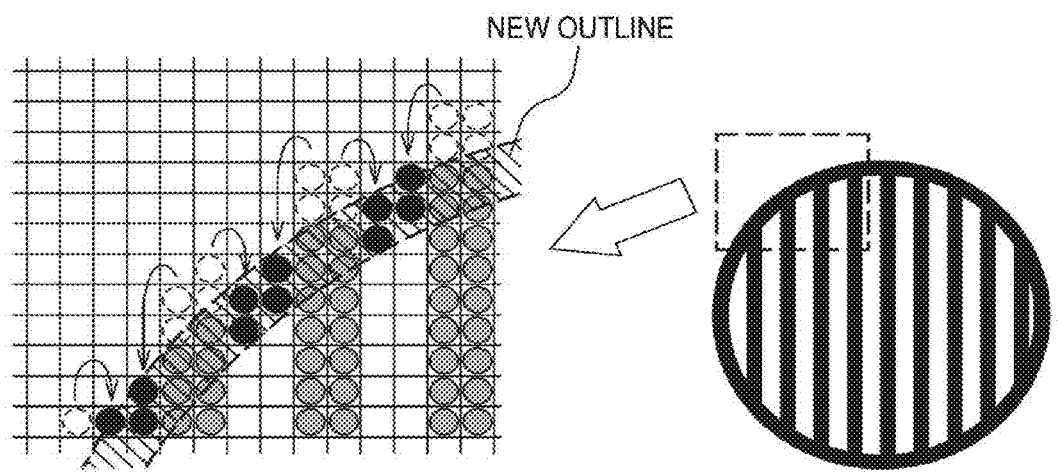

FIGS. 18A and 18B are views illustrating a metallic image formed by the embodiment and the outline. A view when the pixels on the outline of the metallic image are thinned is provided at the right in FIG. 18A. Further, a view enlarging the portion surrounded by a rectangular boundary indicated by a dotted line in the metallic image is provided at the right in FIG. 18A. In the left view, one mesh of the region sectioned by meshes indicates one pixel and the colored dots shows that a dot is formed in the pixel. Further, the hatched region indicates pixels forming the outline of the metallic image.

In FIG. 18A, the outline is in a toothless state because the dots of the outline of the metallic image are thinned. Accordingly, the image itself is unclear because the outline is seen being disconnected.

On the other hand, in the embodiment, as in the view at the left in FIG. 18B, some of the pixel data except for the dot thinning target in the pixels on the outline of the metallic image are moved to the pixels that are the thinning targets. That is, some of the dots (dots drawn by a dotted line) formed in the pixels that are not the thinning target in the outermost pixels (on the outline of the original image) of the metallic image are moved to the pixels that are the thinning target (deep-colored dots). Therefore, the pixels having a toothless shape on the metallic image is filled with the moved dots, such that a new outline is formed. Further, in the new outline, since the amount of metallic ink ejected per unit is larger than the amount in the inside thinning region, such that the outline is seen clean. Accordingly, it is possible to definite metallic image.

Effect of Sixth Embodiment

In the sixth embodiment, the entire region of the metallic image is also a thinning target. Further, a new outline is formed by moving some of the dot data of the pixels that are not the thinning target in the outer circumference of the metallic image to the positions of the pixels that are the thinning target.

Accordingly, it is possible to print a metallic image as a clear image with favorable metallic luster and color tone and the portion, which is the new outline, seen clear. Further, in the embodiment, the outermost dots in the metallic image are shifted inward, such that an image smaller bay one to several pixels than the metallic image is formed. However, since the metallic ink dots are thinned at a predetermined ratio throughout the region of the metallic image that is the original image, the metallic image becomes unclear unless the outline is emphasized, such that the image quality is deteriorated. Therefore, even if the image is slight decreased in size by adding an outline, it does not matter.

Other Embodiments

Although a printer or the like is described as an embodiment, the embodiment is provided to help understanding the invention and should not be construed as limiting the invention. The invention may be changed and modified without departing from the spirit and the equivalents are included in the invention. In particular, the embodiments described below are included in the invention.

Image Forming Apparatus

In the embodiments, an ink jet printer is described as an example of the image forming apparatus that records an image on a medium, but the invention is not limited thereto. For example, the same technology as the embodiment may be applied to a variety of liquid ejecting apparatuses, such as a color filter manufacturing apparatus, a dyeing apparatus, a fine machining apparatus, a semiconductor manufacturing apparatus, a surface machining apparatus, a 3D molding machine, a liquid vaporizer, an organic EL manufacturing apparatus (particularly, polymeric EL manufacturing apparatus), a display manufacturing apparatus, a film forming apparatus, and a DNA tip manufacturing apparatus.

Ink Used Herein

In the embodiments described above, an example of ink containing silver particles or aluminum particles as metallic ink is described, the invention is not limited thereto. For example, ink containing other particles, such as copper or gold, may be used as long as the ink can implement metallic luster in printing.

Further, although an example of recording that uses four color ink of KCMY as color ink is described, recording may be performed by using color ink other than KCMY, such as light cyan, light magenta, white, or clear.

Piezo Element

In the embodiment, piezo elements PZT are exemplified as the elements for performing the operation of ejecting liquid, other element may be used. For example, a heater element or an electrostatic actuator may be used.

Printer Driver

The process of the printer drive may be performed by the computer 110 (PC) or the printer 1, which is an external device. Further, when the process is performed by the PC, an image forming apparatus is composed of a printer and a PC where a printer driver is installed.

Other Apparatuses

In the embodiments described above, the printer 1 that moves the head 41 with the carriage is exemplified, but the printer may be a so-called line printer with a head fixed.

What is claimed is:

1. An image forming apparatus comprising:
a head unit that ejects ink; and
a control unit that:
creates pixel data showing an amount of the ink to be ejected for predetermined pixels, and
ejects metallic ink containing metallic particles from the head unit on the basis of the pixel data for outline pixels on an outline of a metallic image and inside pixels of the metallic image which are inside the outline pixels, the metallic ink being ejected such that:
the amount of the metallic ink ejected for the inside pixels is smaller than the amount of the metallic ink shown by the pixel data for the inside pixels, and such that
the amount of ejected ink per area in the outline pixels is larger than the amount of ejected ink per area in the inside pixels,
wherein the control unit increases the number of pixels in the outline pixels when the amount of data thinned from the pixel data is large, and decreases the number of pixels in the outline pixels when the amount of data thinned from the pixel data is small.

2. The image forming apparatus according to claim 1, wherein the control unit creates metallic print data showing pixels with discharged metallic ink and pixels without discharged metallic ink by thinning the pixel data of predetermined pixels of the inside pixels.

3. The image forming apparatus according to claim 1, wherein the control unit ejects the metallic ink in the amount shown by the pixel data to the outline pixels.

4. The image forming apparatus according to claim 1, wherein the control unit thins the data of predetermined pixels in the pixel data and ejects the metallic ink onto pixels outside the outline pixels.

5. An image forming apparatus comprising:
a head unit that ejects ink; and
a control unit that:
creates pixel data showing an amount of the ink to be ejected for predetermined pixels, and
ejects metallic ink containing metallic particles from the head unit on the basis of the pixel data for outline pixels on an outline of a metallic image and inside pixels of the metallic image which are inside the outline pixels, the metallic ink being ejected such that:
the amount of the metallic ink ejected for the inside pixels is smaller than the amount of the metallic ink shown by the pixel data for the inside pixels, and such that
the amount of ejected ink per area in the outline pixels is larger than the amount of ejected ink per area in the inside pixels
wherein the control unit thins the data of predetermined pixels in the pixel data and, in the outline pixels, moves some of the data of pixels which are not targeted to be thinned to pixels which are targeted to be thinned.

6. An image forming method comprising:
ejecting ink from a head unit; and
creating pixel data showing an amount of the ink to be ejected for predetermined pixels, and
ejecting metallic ink containing metallic particles from the head unit on the basis of the pixel data for outline pixels on an outline of a metallic image and inside pixels of the metallic image which are inside the outline pixels, the metallic ink being ejected such that:
the amount of the metallic ink ejected for the inside pixels is smaller than the amount of the metallic ink shown by the pixel data for the inside pixels, and such that
the amount of ejected ink per area in the outline pixels is larger than the amount of ejected ink per area in the inside pixels
wherein the number of pixels in the outline pixels is increased when the amount of data thinned from the pixel data is large, and the number of pixels in the outline pixels is decreased when the amount of data thinned from the pixel data is small.

* * * * *